United States Patent
Camp, Jr.

(10) Patent No.: US 7,453,956 B2
(45) Date of Patent: Nov. 18, 2008

(54) APPARATUS, METHODS AND COMPUTER PROGRAM PRODUCTS FOR SIGNAL ACQUISITION USING COMMON DEMODULATION TEMPLATES

(75) Inventor: William O. Camp, Jr., Chapel Hill, NC (US)

(73) Assignee: Sony Ericsson Mobile Communications AB, Swedn (SE)

(*) Notice: Subject to any disclaimer, the term of this patent is extended or adjusted under 35 U.S.C. 154(b) by 601 days.

(21) Appl. No.: 10/919,114

(22) Filed: Aug. 16, 2004

(65) Prior Publication Data

US 2006/0034393 A1    Feb. 16, 2006

(51) Int. Cl.
H03D 3/18    (2006.01)
(52) U.S. Cl. ...................................... 375/324
(58) Field of Classification Search ............. 375/142, 375/143, 150, 152, 324, 343; 704/216, 218, 704/237, 263; 708/5, 422, 813; 342/108, 342/145, 189, 378

See application file for complete search history.

(56) References Cited

U.S. PATENT DOCUMENTS

| | | | |
|---|---|---|---|
| 4,445,118 A | 4/1984 | Taylor et al. | 343/357 |
| 4,457,006 A | 6/1984 | Maine | 375/87 |
| 4,601,005 A | 7/1986 | Kilvington | 364/602 |
| 4,701,934 A | 10/1987 | Jasper | 375/1 |
| 4,785,463 A | 11/1988 | Jane et al. | 375/1 |
| 4,797,677 A | 1/1989 | MacDoran et al. | 342/352 |
| 4,959,656 A | 9/1990 | Kumar | 342/418 |
| 4,998,111 A | 3/1991 | Ma et al. | 342/352 |
| 5,043,736 A | 8/1991 | Darnell et al. | 342/357 |
| 5,119,102 A | 6/1992 | Barnard | 342/357 |
| 5,153,598 A | 10/1992 | Alves, Jr. | 342/352 |
| 5,202,829 A | 4/1993 | Geier | 364/449 |
| 5,223,844 A | 6/1993 | Mansell et al. | 342/357 |
| 5,225,842 A | 7/1993 | Brown et al. | 342/357 |
| 5,245,634 A | 9/1993 | Averbuch | 375/108 |
| 5,271,034 A | 12/1993 | Abaunza | 375/1 |
| 5,311,194 A | 5/1994 | Brown | 342/357 |

(Continued)

FOREIGN PATENT DOCUMENTS

DE    4424412    1/1996

(Continued)

OTHER PUBLICATIONS

Krumvieda et al., "A Complete IF Software GPS Receiver: A Tutorial about the Details," published by Data Fusion Corporation, www.datafusion.com, 2004, pp. 1-22.

(Continued)

*Primary Examiner*—Sam K Ahn
(74) *Attorney, Agent, or Firm*—Myers Bigel Sibley & Sajovec, PA

(57) ABSTRACT

A target modulation is detected in a signal, e.g., a radio signal received by a device such as a mobile communications terminal. Respective target modulation correlations for respective carrier timing hypotheses are determined by demodulating signal values corresponding to the signal for the respective carrier timing hypotheses using a common carrier demodulation template and detecting the target modulation from the target modulation correlations. The target modulation may be, for example, a pseudonoise (PN) code, such as a GPS code or a CDMA communications system code, and the carrier timing hypotheses may correspond to various potential Doppler shifts.

35 Claims, 40 Drawing Sheets

U.S. PATENT DOCUMENTS

| | | | |
|---|---|---|---|
| 5,317,323 A | 5/1994 | Kennedy et al. | 342/357 |
| 5,323,163 A | 6/1994 | Maki | 342/357 |
| 5,323,322 A | 6/1994 | Mueller et al. | 364/449 |
| 5,365,450 A | 11/1994 | Schuchman et al. | 364/449 |
| 5,379,047 A | 1/1995 | Yokev et al. | 342/457 |
| 5,379,224 A | 1/1995 | Brown et al. | 364/449 |
| 5,379,320 A | 1/1995 | Fernandes et al. | 375/1 |
| 5,416,797 A | 5/1995 | Gilhousen et al. | 375/705 |
| 5,418,538 A | 5/1995 | Lau | 342/357 |
| 5,420,592 A | 5/1995 | Johnson | 342/357 |
| 5,420,593 A | 5/1995 | Miles | 342/357 |
| 5,430,759 A | 7/1995 | Yokev et al. | 375/202 |
| 5,448,773 A | 9/1995 | McBurney et al. | 455/343 |
| 5,483,549 A | 1/1996 | Weinberg et al. | 375/200 |
| 5,491,486 A | 2/1996 | Welles et al. | 342/357 |
| 5,621,646 A | 4/1997 | Enge et al. | 364/449 |
| 5,663,734 A | 9/1997 | Krasner | 342/357 |
| 5,663,735 A | 9/1997 | Eshenbach | 342/357 |
| 5,781,156 A | 7/1998 | Krasner | 342/357 |
| 5,812,087 A | 9/1998 | Krasner | 342/357 |
| 5,874,914 A | 2/1999 | Krasner | 342/357 |
| 6,075,987 A | 6/2000 | Camp, Jr. et al. | 455/427 |
| 6,133,871 A | 10/2000 | Krasner | 342/357.06 |
| 6,151,353 A | 11/2000 | Harrison et al. | |
| 6,188,351 B1 | 2/2001 | Bloebaum | 342/357.15 |
| 6,204,808 B1 | 3/2001 | Bloebaum et al. | 342/357.07 |
| 6,252,543 B1 | 6/2001 | Camp | 342/357.06 |
| 6,295,023 B1 | 9/2001 | Bloebaum | 342/357.06 |
| 6,323,803 B1 | 11/2001 | Jolley et al. | 342/357.03 |
| 6,370,475 B1 | 4/2002 | Breed et al. | 701/301 |
| 6,388,618 B1 | 5/2002 | Stilp et al. | 342/457 |
| 6,389,291 B1 | 5/2002 | Pande et al. | 455/456 |
| 6,405,132 B1 | 6/2002 | Breed et al. | 701/301 |
| 6,407,699 B1 | 6/2002 | Yang | 342/357.12 |
| 6,433,734 B1 | 8/2002 | Krasner | 342/357.09 |
| 6,433,735 B1 | 8/2002 | Bloebaum et al. | 342/357.1 |
| 6,535,815 B2 | 3/2003 | Bloebaum | 701/213 |
| 6,577,271 B1 | 6/2003 | Gronemeyer | |
| 6,583,758 B2 | 6/2003 | King | 342/357.13 |
| 6,642,886 B2 | 11/2003 | King | 342/357.15 |
| 6,664,921 B2 | 12/2003 | Pratt | 342/357.06 |
| 6,720,920 B2 | 4/2004 | Breed et al. | 342/386 |
| 6,738,713 B2 | 5/2004 | Pratt | 710/213 |
| 7,010,060 B2 * | 3/2006 | Ledvina et al. | 375/316 |
| 2003/0008663 A1 | 1/2003 | Stein et al. | 455/456 |
| 2004/0063411 A1 | 4/2004 | Goldberg et al. | 455/192.2 |
| 2005/0007277 A1 | 1/2005 | Iancu et al. | |

FOREIGN PATENT DOCUMENTS

| | | |
|---|---|---|
| EP | 0 444 738 | 9/1991 |
| EP | 0 447 978 | 9/1991 |
| EP | 1203965 A2 | 5/2002 |
| GB | 2 273 218 | 6/1994 |
| GB | 2 308 033 | 6/1997 |
| WO | 94/28434 | 12/1994 |
| WO | 95/17686 | 6/1995 |
| WO | 96/15636 | 5/1996 |
| WO | 97/14049 | 4/1997 |

OTHER PUBLICATIONS

Data Sheet, "12-channel SoftGPS for TI's C55x," Spirit Corp., 2004, 1 page.

Data Sheet, "24-channel GPS + GLONASS receiver," Spirit Corp., 2004, 2 pages.

Lamance, et al., "Assisted GPS: A Low-Infrastructure Approach," GPS World, Jul. 5, 2004, 3 pages.

"GPS Software Receiver Toolkits," Data Fusion Corporation, http://www.datafusion.com/gps.htm, Jul. 8, 2004, 6 pages.

Notification of Transmittal of the International Search Report and the Written Opinion of the International Search Authority, or the Declaration, PCT/US2005/005758, Jun. 6, 2005.

* cited by examiner

APPARATUS, METHODS AND COMPUTER PROGRAM PRODUCTS FOR SIGNAL ACQUISITION USING COMMON DEMODULATION TEMPLATES

BACKGROUND OF THE INVENTION

The present invention relates to spread-spectrum communications, and more particularly, to apparatus, methods and computer program products for acquiring spread spectrum signals.

The Global Positioning System (GPS) is a space-based navigational communications system using satellites and associated ground-based components to provide positional information around the earth. Advantages of this navigational system over land-based systems include worldwide and continuous coverage, which may be highly accurate regardless of weather conditions.

In operation, GPS satellites orbit the earth and continually emit GPS radio signals. A GPS receiver, e.g., a portable device with a GPS processor, receives radio signals from visible satellites and measures the time that each radio signal takes to travel from the GPS satellites to the GPS receiver antenna and, from this information, calculates a range for each acquired satellite. Standalone GPS receivers are widely used by military forces, mariners, hikers, and surveyors. GPS capability may also be provided in mobile communications terminals (e.g., cellular handsets) to provide position location functionality that may be used, for example, for location based services (LBS).

Ephemeris information provided in the GPS satellite radio signal typically describes the satellite's orbit and velocity, thereby generally enabling the GPS processor to calculate the position of the GPS receiver through a process of triangulation. Generation of an accurate positional fix by a GPS receiver typically requires the acquisition of a set of navigational parameters from the navigational data signals from four or more such GPS satellites.

Part of acquisition process for a GPS satellite signal involves determination of the code phase of the spread-spectrum GPS signal so that distance to the transmitting satellite can be determined and to allow recovery of ephemeris data and other information from the signal. A typical GPS-enabled device includes a radio processor that downconverts a radio signal received from an antenna to an intermediate frequency (IF) signal. In order to search for a GPS signal in the received signal, samples of the IF signal are typically demodulated at each of a plurality of discrete IF frequency hypotheses corresponding to a range of possible frequency shifts that may be attributable to Doppler shift caused by relative movement of the device and the transmitting satellite, local oscillator frequency errors, and other sources. Each of the demodulated signals is then correlated with the satellite's assigned spreading code at each of a plurality of time shifts to generate correlation information that is used to determine the timing of the satellite's spread-spectrum signal, i.e., the code phase.

In some conventional GPS code search techniques, to test a particular IF frequency hypotheses, the sampled IF signal sample stream may be multiplied by sine and cosine sequences with the same frequency as the IF frequency hypotheses to generate candidate in-phase (I) and quadrature (Q) data streams (if the frequency hypothesis is accurate, these two streams should substantially correspond to actual I and Q components of the IF signal in a non-rotating framework). The two candidate I and Q streams are multiplied by the PN code sequence being searched for over a plurality of code frequency hypotheses and code phase hypotheses, with the PN code sequence being expanded or contracted to fit the sample domain frequency for each hypothesis. If a hypothesized combination of code frequency, code phase and IF frequency hypothesis is accurate, then a maximum correlation value should be produced. This process may be typically repeated over a search space including different IF carrier hypotheses, PN code starting point hypotheses, and PN code frequency hypotheses until a maximum correlation value is found.

SUMMARY OF THE INVENTION

According to some embodiments of the present invention, methods of searching for a target modulation in a signal are provided. Each of the following is performed for each of a plurality of hypothetical carrier timings: signal values corresponding to the signal are shifted according to a relationship between the hypothethical carrier timing and a reference carrier timing; the shifted signal values are demodulated according to the reference carrier timing to produce demodulated signal values; the demodulated signal values are shifted according to the relationship of the hypothetical carrier timing and the reference carrier timing; and a correlation of the shifted demodulated signal values with the target modulation is determined. The target modulation is detected responsive to the determined correlations for the hypothetical carrier timings. According to further embodiments of the present invention, determining a correlation of the shifted demodulated signal values with the target modulation includes determining respective correlations of the shifted demodulated signal values with respective time-shifted versions of the target modulation, and detecting the target modulation responsive to the determined correlations for the hypothetical carrier timings includes detecting a phase of the target modulation code responsive to the determined correlations. The target modulation may be, for example, a pseudonoise (PN) code, such as a GPS code or a CDMA communications system code.

In further embodiments of the present invention, demodulation of the shifted signal values according to the reference carrier timing to produce demodulated signal values may include sorting the shifted signal values into in-phase (I) and quadrature (Q) signal value sets and multiplying the respective I and Q signal value sets by respective sine and cosine reference sequences at the reference carrier timing to produce demodulated I and Q signal value sets. The demodulated I and Q signal value sets may be shifted according to the relationship of the hypothetical carrier timing and the reference carrier timing, and respective correlations of the shifted demodulated I and Q signal value sets with the target modulation may be determined. The target modulation may be detected responsive to the determined correlations of the shifted demodulated I and Q signal value sets with the target modulation.

According to further aspects of the present invention, shifting signal values corresponding to the signal according to a relationship between the hypothethical carrier timing and a reference carrier timing includes augmenting or reducing a set of signal values according to the relationship between the hypothethical carrier timing and a reference carrier timing, and shifting the demodulated signal values according to the relationship of the hypothetical carrier timing and the reference carrier timing includes augmenting or reducing a set of demodulated signal values according to the relationship of the hypothetical carrier timing and the reference carrier timing. Augmenting or reducing a set of signal values according to the relationship between the hypothethical carrier timing and a reference carrier timing may include replicating or removing signal values at periodic sample intervals, and augmenting or reducing a set of demodulated signal values according to the relationship of the hypothetical carrier timing and the reference carrier timing may include replicating or removing signal values at periodic sample intervals.

In additional embodiments of the present invention, determining a correlation of the shifted demodulated signal values with the target modulation includes performing the following for each a plurality of hypothetical target modulation timings: shifting the shifted demodulated signal values according to a relationship between the target modulation hypothetical timing and a target modulation reference timing to produce a revised set of demodulated signal values; and determining a correlation of the revised set of demodulated signal values with the target modulation at the target modulation reference timing. The target modulation may be detected responsive to the correlations of the revised sets of signal values with the target modulation.

In some embodiments of the present invention, methods for searching for a target modulation in a signal include determining respective target modulation correlations for respective carrier timing hypotheses by demodulating signal values corresponding to the signal for the respective carrier timing hypotheses using a common carrier demodulation template, and detecting the target modulation from the target modulation correlations. In some embodiments, determining respective target modulation correlations for respective carrier timing hypotheses by demodulating signal values for the respective carrier timing hypotheses using a common carrier demodulation template includes shifting signal values for the respective carrier timing hypotheses according to respective relationships between the carrier timing hypotheses and a reference carrier timing, applying the common carrier demodulation template to the shifted signal values for each of the carrier timing hypotheses to generate respective sets of demodulated signal values for the respective carrier timing hypotheses and shifting the respective sets of demodulated signal values according to the respective relationships between the carrier timing hypotheses and the reference carrier timing. Determining respective target modulation correlations for respective carrier timing hypotheses by demodulating signal values for the respective carrier timing hypotheses using a common carrier demodulation template may further include determining respective correlations of the respective shifted sets of demodulated signal values with the target modulation. Detecting the target modulation from the target modulation correlations may include detecting the target modulations from the correlations of the respective shifted sets of demodulated signal values with the target modulation.

In other embodiments of the present invention, determining respective target modulation correlations for respective carrier timing hypotheses by demodulating signal values corresponding to the signal for the respective carrier timing hypotheses using a common carrier demodulation template includes generating respective carrier demodulation templates for the respective carrier timing hypotheses from a common set of kernel templates based on relationships between the respective carrier timing hypotheses and a reference carrier timing, and determining the respective target modulation correlations for the respective carrier timing hypotheses using respective ones of the carrier demodulation templates. Generating respective carrier demodulation templates for the respective carrier timing hypotheses from a common set of kernel templates based on relationships between the respective carrier timing hypotheses and a reference carrier timing may include generating respective derotation templates for the respective carrier timing hypotheses from a common set of derotation kernel templates based on relationships between the respective carrier timing hypotheses and the reference carrier timing. Determining the respective target modulation correlations for the respective carrier timing hypotheses using respective ones of the carrier demodulation templates may include applying the respective derotation templates to the signal values to produce respective sets of derotated signal values and applying a target demodulation template to the respective sets of derotated signal values to generate the respective target modulation correlations.

In further embodiments, detecting the target modulation from the target modulation correlations includes generating respective correlation metrics for the respective target modulation correlations and detecting the target modulation from the correlation metrics. Generating respective correlation metrics for the respective target modulation correlations may include generating the respective correlation metrics without generating separate I and Q target modulation correlations. In alternative embodiments, generating respective correlation metrics for the respective target modulation correlations may include applying respective sets of I and Q templates to the respective sets of derotated signal values to generate respective sets of I and Q correlations for the respective carrier timing hypotheses and generating the respective correlation metrics from the I and Q correlations. The I and Q templates may be generated from a common set of I and Q kernel templates based on relationships between the respective carrier timing hypotheses and a reference carrier timing.

According to further aspects of the present invention, methods of searching for a GPS pseudo noise (PN) code in a signal are provided. Respective PN code correlations are determined for respective IF timing hypotheses by demodulating signal values corresponding to the signal for the respective IF timing hypotheses using a common IF demodulation template. The PN code is detected from the PN code correlations. The IF timing hypotheses may correspond to respective hypothetical Doppler shifts.

In additional embodiments of the present invention, an apparatus for searching for a target modulation in a signal includes means for determining respective target modulation correlations for respective carrier timing hypotheses by demodulating signal values corresponding to the signal for the respective carrier timing hypotheses using a common carrier demodulation template and means for detecting the target modulation from the target modulation correlations. The means for determining respective target modulation correlations for respective carrier timing hypotheses by demodulating signal values for the respective carrier timing hypotheses using a common carrier demodulation template may include means for shifting signal values for the respective carrier timing hypotheses according to respective relationships between the carrier timing hypotheses and a reference carrier timing, means for applying the common carrier demodulation template to the shifted signal values for each of the carrier timing hypotheses to generate respective sets of demodulated signal values for the respective carrier timing hypotheses and means for shifting the respective sets of demodulated signal values according to the respective relationships between the carrier timing hypotheses and the reference carrier timing. In some embodiments, the means for determining respective target modulation correlations for respective carrier timing hypotheses by demodulating signal values corresponding to the signal for the respective carrier timing hypotheses using a common carrier demodulation template includes means for generating respective carrier demodulation templates for the respective carrier timing hypotheses from a common set of kernel templates based on relationships between the respective carrier timing hypotheses and a reference carrier timing and means for determining the respective target modulation correlations for the respective carrier timing hypotheses using respective ones of the carrier demodulation templates.

According to additional aspects of the present invention, a GPS-enabled device, such as a mobile communications terminal, includes a radio processor configured to convert a radio signal to an intermediate frequency (IF) signal values. The device further includes a correlation processor configured to determine respective PN code correlations for respective IF timing hypotheses using a common IF demodulation template and to detect the target modulation from the target modulation correlations.

Additional embodiments of the present invention provide a computer program product for searching for a target modulation in a signal. The computer program product includes computer program code embodied in a computer readable medium. The program code includes program code configured to determine respective target modulation correlations for respective carrier timing hypotheses by demodulating signal values corresponding to the signal for the respective carrier timing hypotheses using a common carrier demodulation template, and program code configured to detect the target modulation from the target modulation correlations.

DETAILED DESCRIPTION OF EXEMPLARY EMBODIMENTS

Figure 1:
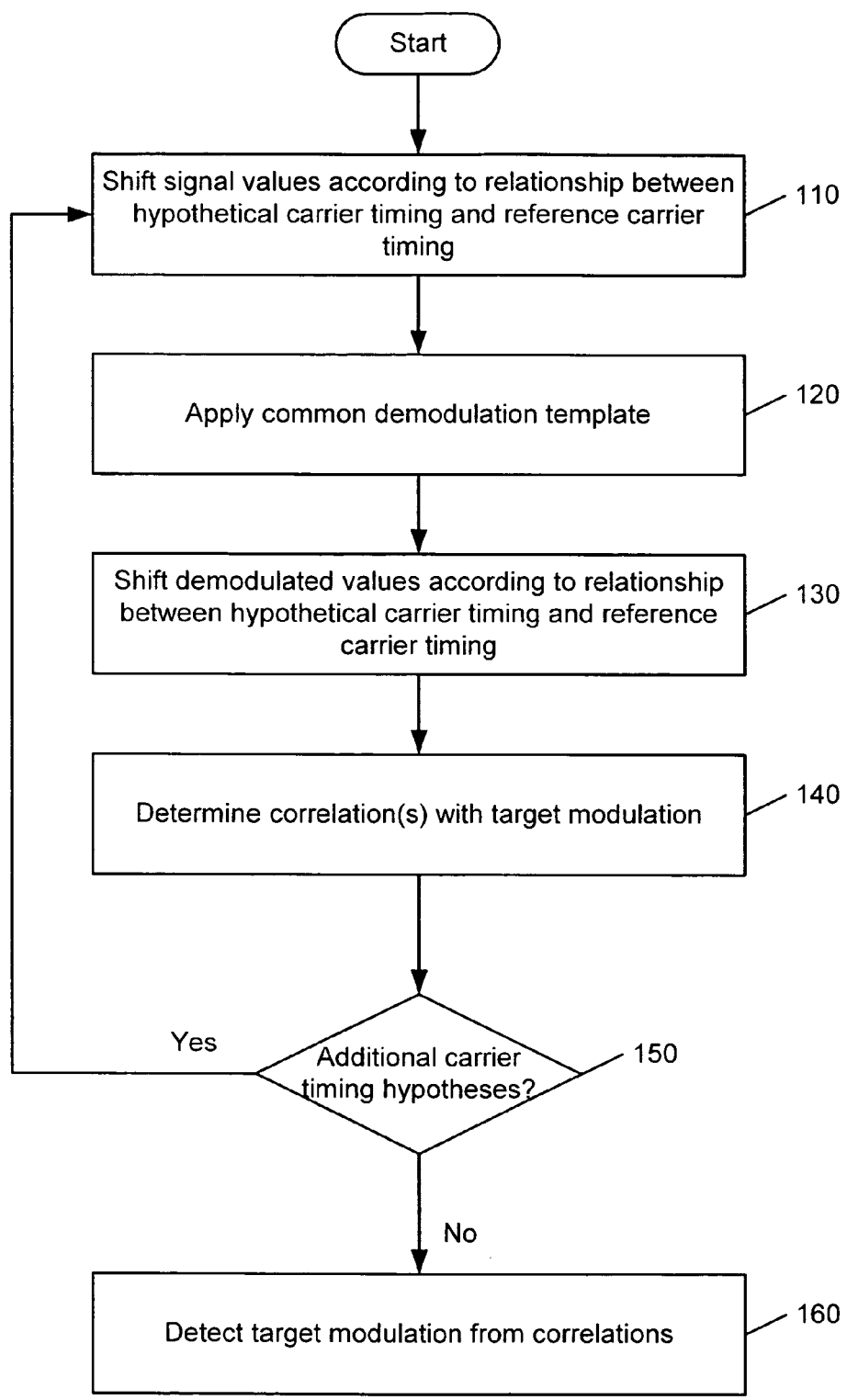
FIGS. 1 and 2 are flowcharts illustrating exemplary operations for detecting a target modulation according to various embodiments of the present invention.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

It also will be understood that, as used herein, the terms "comprising", "comprises", "includes" and "including" are open-ended, i.e., refer to one or more stated elements, steps and/or functions without precluding one or more unstated elements, steps and/or functions. It will also be understood that the term "and/or" as used herein refers to and encompasses any and all possible combinations of one or more of the associated listed items. It will be further understood that when transfer, communication, or other interaction is described as occurring "between" elements, such transfer, communication or other interaction may be unidirectional and/or bidirectional.

The present invention is described below with reference to block diagrams and/or operational illustrations of methods and wireless terminals according to embodiments of the invention. It will be understood that each block of the block diagrams and/or operational illustrations, and combinations of blocks in the block diagrams and/or operational illustrations, can be implemented by analog and/or digital hardware and/or computer program instructions. These computer program instructions may be provided to a processor of a general purpose computer, special purpose computer, ASIC, and/or other programmable data processing apparatus, such that the instructions, which execute via the processor of the computer and/or other programmable data processing apparatus, create means for implementing the functions/acts specified in the block diagrams and/or operational illustrations. In some alternate implementations, the functions/acts noted in the figures may occur out of the order noted in the block diagrams and/or operational illustrations. For example, two operations shown as occurring in succession may, in fact, be executed substantially concurrently or the operations may sometimes be executed in the reverse order, depending upon the functionality/acts involved.

According to some embodiments of the present invention, an apparatus may include circuitry configured to provide operations described herein. Such apparatus may include any of a number of types of devices, including, but not limited to: navigational devices; cellular handsets; computers and peripherals that include a communications interface; personal communication terminals that may combine a cellular wireless terminal with data processing, facsimile and data communications capabilities; and personal data assistants (PDA) that can include a wireless transceiver, pager, Internet/intranet access, local area network interface, wide area network interface, Web browser, organizer, and/or calendar.

Computer program code for carrying out operations of the present invention may be written in an object oriented programming language such as Java®, Smalltalk or C++, a conventional procedural programming languages, such as the "C" programming language, or lower-level code, such as assembly language and/or microcode. The program code may execute entirely on a single processor and/or across multiple processors, as a stand-alone software package or as part of another software package.

Some embodiments of the present invention arise from a realization that various hardware processors, such as Digital Signal Processors (DSPs), can efficiently perform multiply and add operations that are used in modulation search processes, such as GPS code search processes. For example, both carrier derotation and PN code correlation tasks involved in some GPS acquisition techniques involve a series of multiply and add operations with templates of values representing the hypothesized carrier frequency and the hypothesized PN code starting point and frequency. However, because many hypotheses of carrier frequency, PN code phase and PN code frequency typically must be evaluated to find a peak correlation, a very large number of such templates may be needed for the search. This may slow down the processor, due to delays in configuring the various templates. Moreover, conventional search techniques may include a significant number of unnecessary computations.

In some embodiments of the present invention, pre-processing and post-processing of a signal data set may be performed such that a common modulation template may be used for demodulation for each of a plurality of carrier frequency hypotheses. In further embodiments, a common code template may be used to further process a data set from a carrier demodulation algorithm for multiple code frequency hypotheses.

FIG. 1 illustrates exemplary techniques for detecting a target modulation, e.g., a GPS PN code, according to some embodiments of the present invention. Signal values, e.g., sampled IF signal values, are shifted according to a relationship between a hypothetical carrier timing and a reference carrier timing (block 110). A common demodulation template is then applied to the shifted signal values (block 120). The resulting demodulated signal values are shifted again based on the relationship between the hypothetical carrier timing and the reference carrier timing (block 130), e.g., to undo (or substantially undo) the time distortion induced by the prior shift. One or more correlations of the shifted demodulated signal values with the target modulation are then determined (block 140). For example, multiple correlations may be determined for a plurality of target modulation phase and frequency hypotheses. If another carrier timing hypothesis remains to be evaluated, the pre-shifting, demodulation, post-shifting, and correlation operations are then repeated for the new carrier timing hypothesis (blocks 150, 110-140). Once correlations for a plurality of carrier timing hypotheses have been generated, the target modulation may be detected from the correlations, e.g., by identifying a maximum correlation (block 160). Thus, for example, a phase of the target modulation may be determined.

Figure 2:
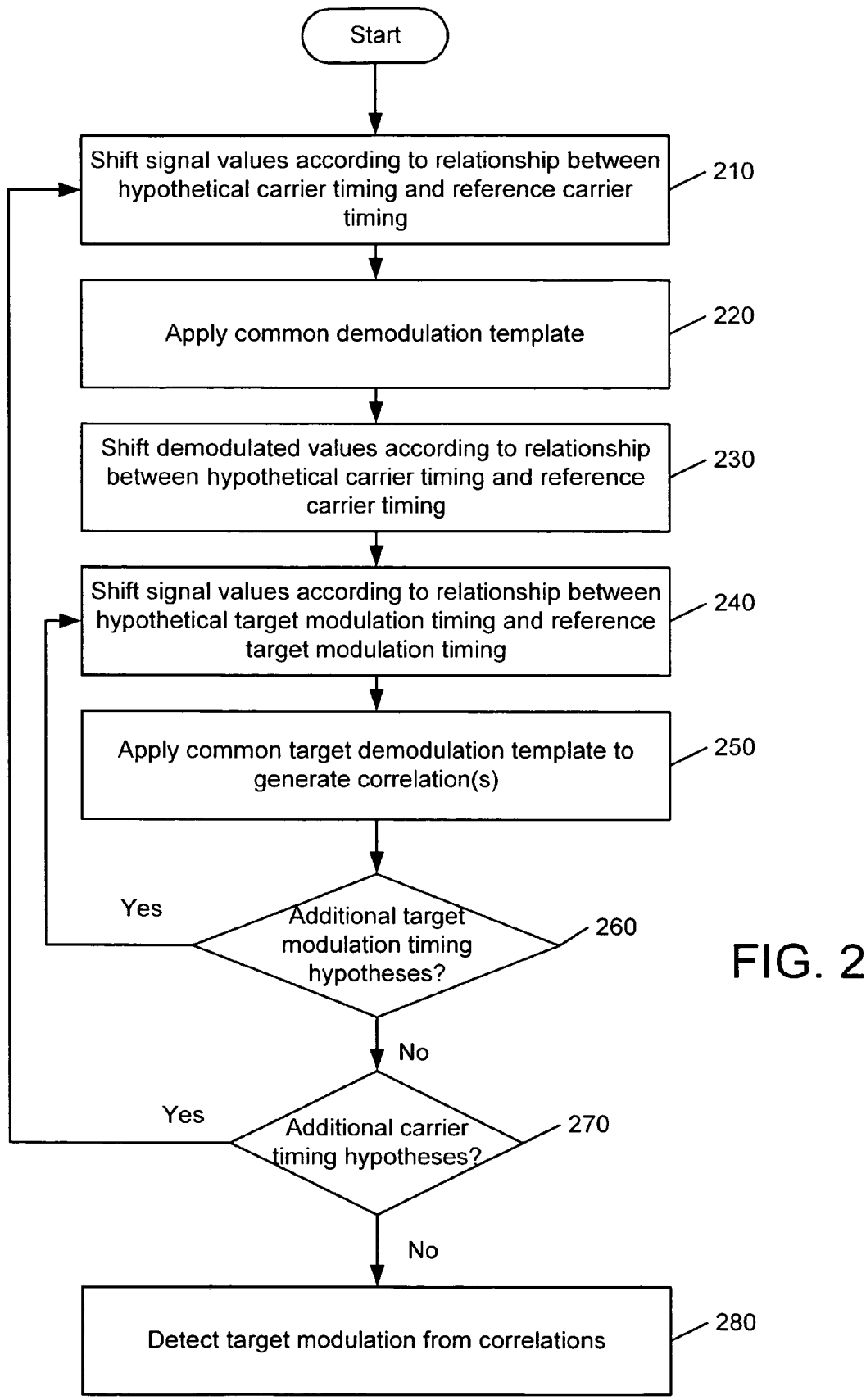

FIG. 2 illustrates exemplary operations according to further embodiments of the present invention. Signal values, e.g., sampled IF signal values, are shifted according to a relationship between a hypothetical carrier timing and a reference carrier timing (block 210). A common demodulation template is then applied to the shifted signal values (block 220). The resulting demodulated signal values are shifted again based on the relationship between the hypothetical carrier timing and the reference carrier timing (block 230).

In an inner loop (blocks 240-260), a multiple target modulation timing hypotheses for the given carrier timing hypothesis are evaluated. In particular, the shifted demodulated signal values are shifted according to a relationship between a hypothetical target modulation timing and a reference target modulation timing (block 240). A common target demodulation template is then applied to generate one or more correlations with the target modulation (block 250). It will be appreciated that the correlations may be for a plurality of hypothetical phases for the target modulation. At block 260, if another target modulation timing remains to be evaluated, the shifting and demodulation operations (blocks 240, 250) are repeated for the new hypothesis, such that correlations are generated for each target modulation-timing hypothesis.

Jumping back out to the outer search loop, once correlations for all of the target modulation timing hypotheses have been generated, and another carrier timing hypothesis is to be evaluated (block 270), the pre-shifting operation (block 210), the demodulation operation (block 220), the post-shifting operation (block 230), and the inner loop operations (blocks 240, 250) are then repeated for the new carrier timing hypothesis. At block 270, once correlations for a plurality of carrier timing hypotheses have been generated, the target modulation may be detected from the correlations, e.g., by identifying a maximum correlation (block 280).

Figure 3:
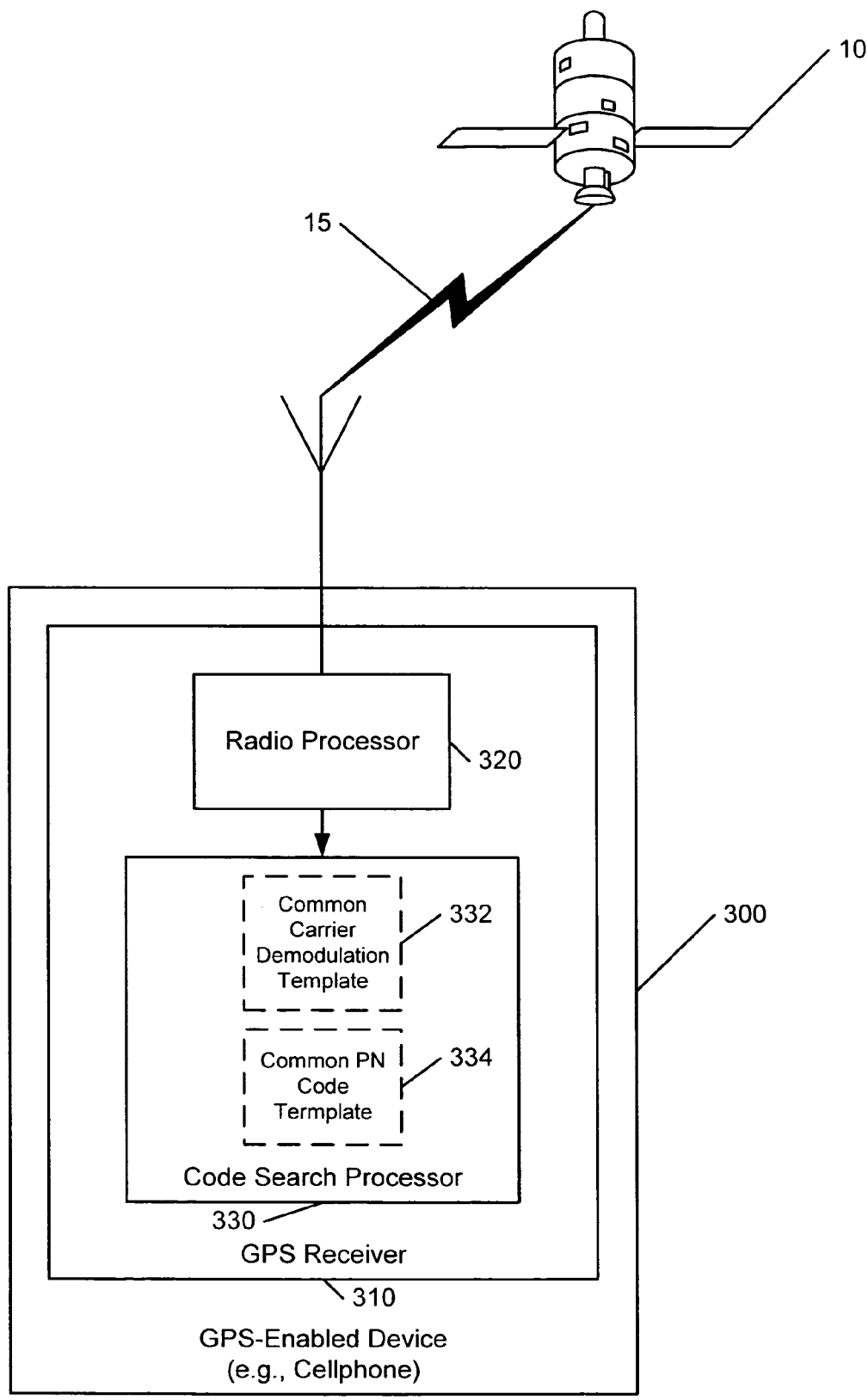
FIG. 3 is a schematic diagram illustrating an exemplary GPS implementation according to further embodiments of the present invention.

FIG. 3 illustrates an example of an environment in which some embodiments of the present invention may be employed, in particular, to code acquisition in a GPS-enabled device 300. The GPS-enabled device 300 may be, for example, a navigational device, a cellular telephone, or other personal communications and/or computing device. The device 300 includes a GPS receiver 310 including a radio processor 320 and a code search processor 334. The radio processor receives radio frequency signals, including a GPS signal 15 transmitted by a GPS satellite 10. The radio processor 320 downconverts the received signal to a lower frequency signal, which is provided (e.g., in the form of digital samples) to the code search processor 330. For example, the radio processor 320 may be configured to downconvert a radio signal with a nominal frequency of 1575.42 MHz to an IF signal with a nominal frequency of 1.023 MHz. It will be appreciated that this IF frequency is merely an example, and provides a convenient relationship to a sampling frequency of 4.092 Mega samples/sec. Other IF frequencies may be more suitable, for example, for other sampling rates.

The code search processor 330 is configured to search a plurality of carrier timing (e.g., frequency/period) hypotheses for the GPS signal 15 as received at the device 300 using a common carrier modulation template 332 and/or a common code demodulation template 334. In particular, in some exemplary implementations described below, the code search processor 330 may be operative to shift signal values derived from the received signal to align various carrier timing and/or code timing hypotheses to the common templates, such that efficient search of a frequency/code space may be achieved using a reduced number of demodulation templates. In other embodiments, shifted carrier demodulation templates may be generated from a common set of kernel templates.

It will be appreciated that, while some embodiments of the invention may be particularly advantageous in GPS applications, such exemplary embodiments described herein, the present invention encompasses a variety of other signal search applications. For example, in some embodiments of the present invention, techniques along the lines described herein may be used for other spread-spectrum signal acquisition applications, for example, in acquiring communications signals, such as pilot and synchronization signals. It will be further appreciated that, although radio-based GPS applications are discussed herein, the present invention also encompasses embodiments using other transmission media, such as wire and optical communications applications.

An exemplary code search technique according to some embodiments of the present invention will now be described with reference to FIGS. 4-17, which are signal graphs illustrating exemplary operations on signal data such as might be used, for example, in a GPS application. In the illustrated process, an input sampled stream is first pre-shifted to make the timing of the samples fit a time scale of common in-phase (I) and quadrature (Q) demodulation templates. The resulting signal values are then separated into separate I and Q signal value streams, by a relatively simple sorting process, and the I and Q signal value streams are multiplied by the respective I and Q templates. The resulting demodulated I and Q signal value streams are then post-shifted to remove the effects of the pre-shifting step, and then shifted additionally to make each compatible with a common code demodulation template. The shifted streams are then each multiplied by the common code demodulation template to generated correlations.

It will be understood that multiplication of two waveforms as described herein is done point by point through the waveforms, and that correlation involves multiplying two waveforms and summing the individual multiplication outputs through the length of the waveform. Correlation may include multiplication of two waveforms more than once to complete the correlation process, much like the above-described process in which the first step removes the IF carrier and the second step reverses the modulation process done at the transmitter. The degree of match between the input signal and the hypothesized IF carrier frequency and the starting point and frequency of the modulation waveform determines the correlation result. In the case of GPS and CDMA signals, the signal typically is not "visible" until the correlation process is actually completed.

Figure 4:
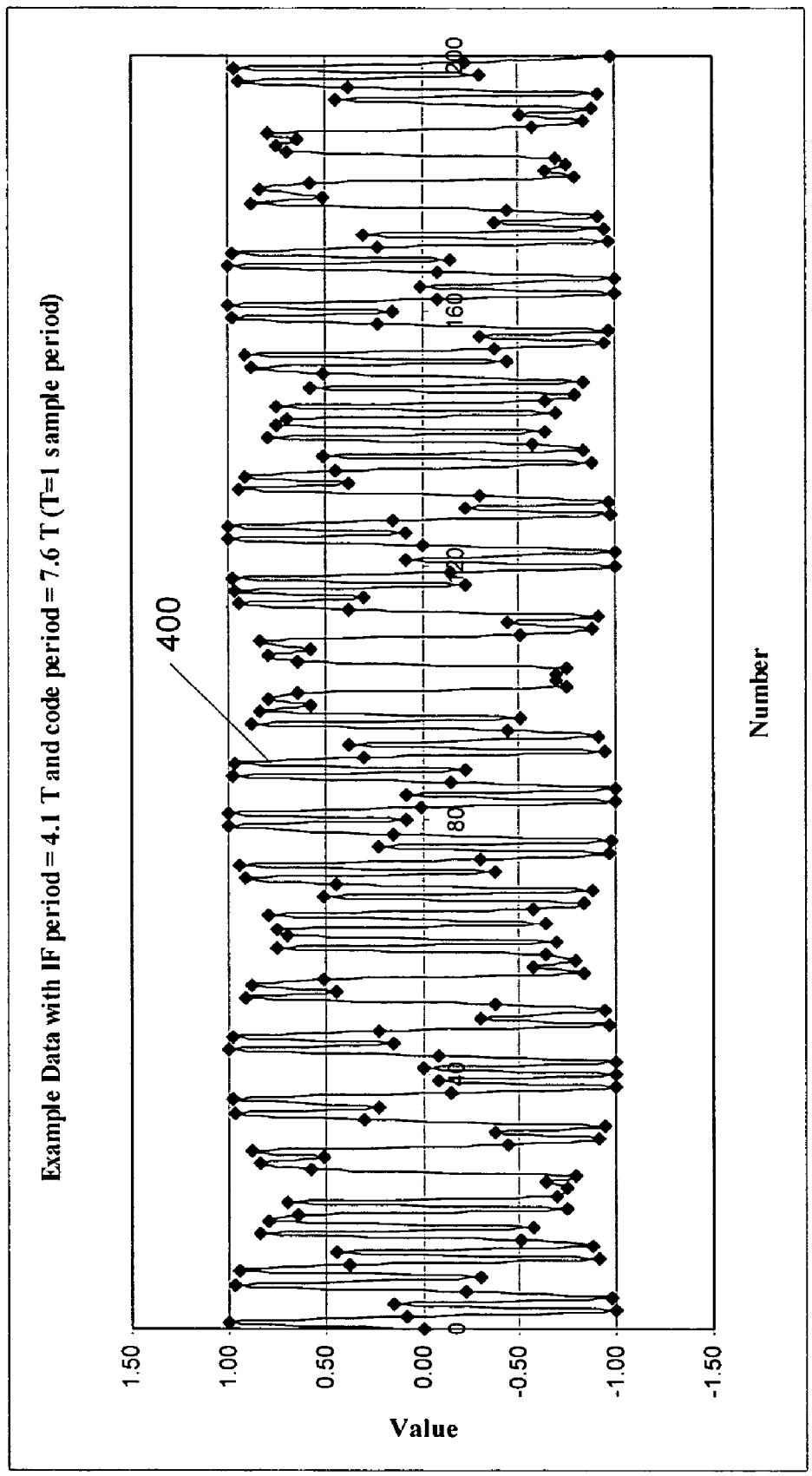
FIGS. 4-17 are signal diagrams illustrating exemplary operations for detecting a target modulation according to some embodiments of the present invention.
Figure 5:
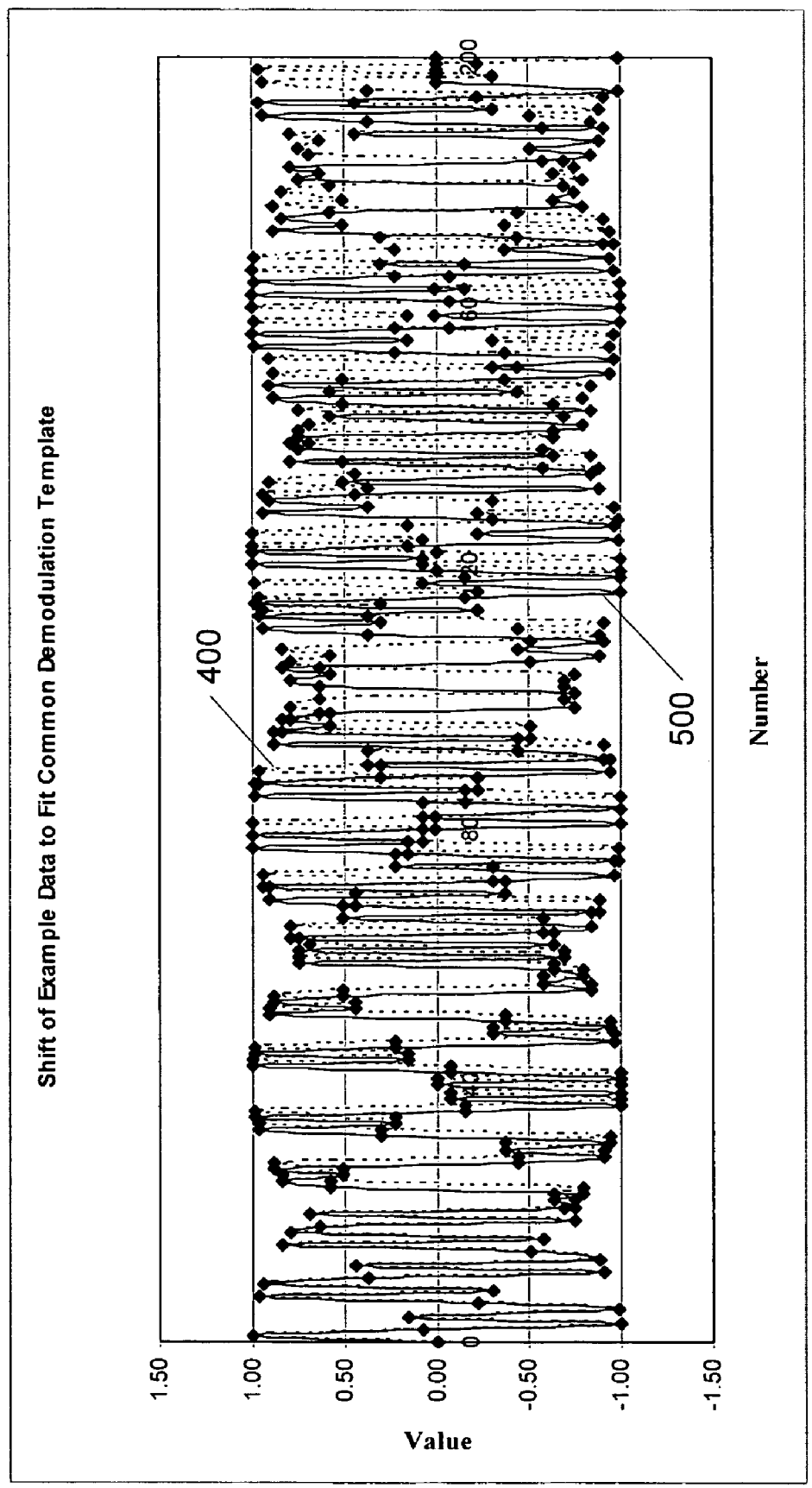

Referring to FIG. 4, an example signal sample data 400 is illustrated. As indicated, the data corresponds to an IF period of 4.1T, where T is the sampling period for the data, and a PN code period of 7.6T. Referring now to FIG. 5, the data 400 is shifted to adjust the data 400 to match common sine and cosine templates. This is done by adjusting the input waveform to match a sine waveform of 0,1,0,−1,0,1,0 . . . and a cosine waveform of 1,0,−1,0,1,0,−1, . . . . As noted above, the example data happens to have a period of 4.1T. To align this data with a reference IF period of 4T, every mth sample is deleted, with the remaining samples being shifted (to the left in the diagram) accordingly. The index m is given by:

$$m = \frac{T_{IF,h}}{T_{IF,h} - T_{IF,ref}}, \qquad (1)$$

where $T_{IF,h}$ is a hypothesized IF frequency for the signal and $T_{IF,ref}$ is a reference IF frequency associated with the common templates. For the instant example, assuming a (correct) hypothesis that the IF carrier has a period of 4.1T, m=4.1*1/0.1, each $41^{st}$ signal value is removed to produce a modified set of signal values 500, as shown in FIG. 5. It will be appreciated that for a hypothesis with a period less than the reference period of 4T, signal samples could be duplicated in a similar fashion. Because the data has been shifted to match the desired period of the sine and cosine templates, the signal values can now be sorted into I and Q sets 600 and 700 by alternately assigning samples to the sets, as shown in FIGS. 6 and 7.

Figure 6:
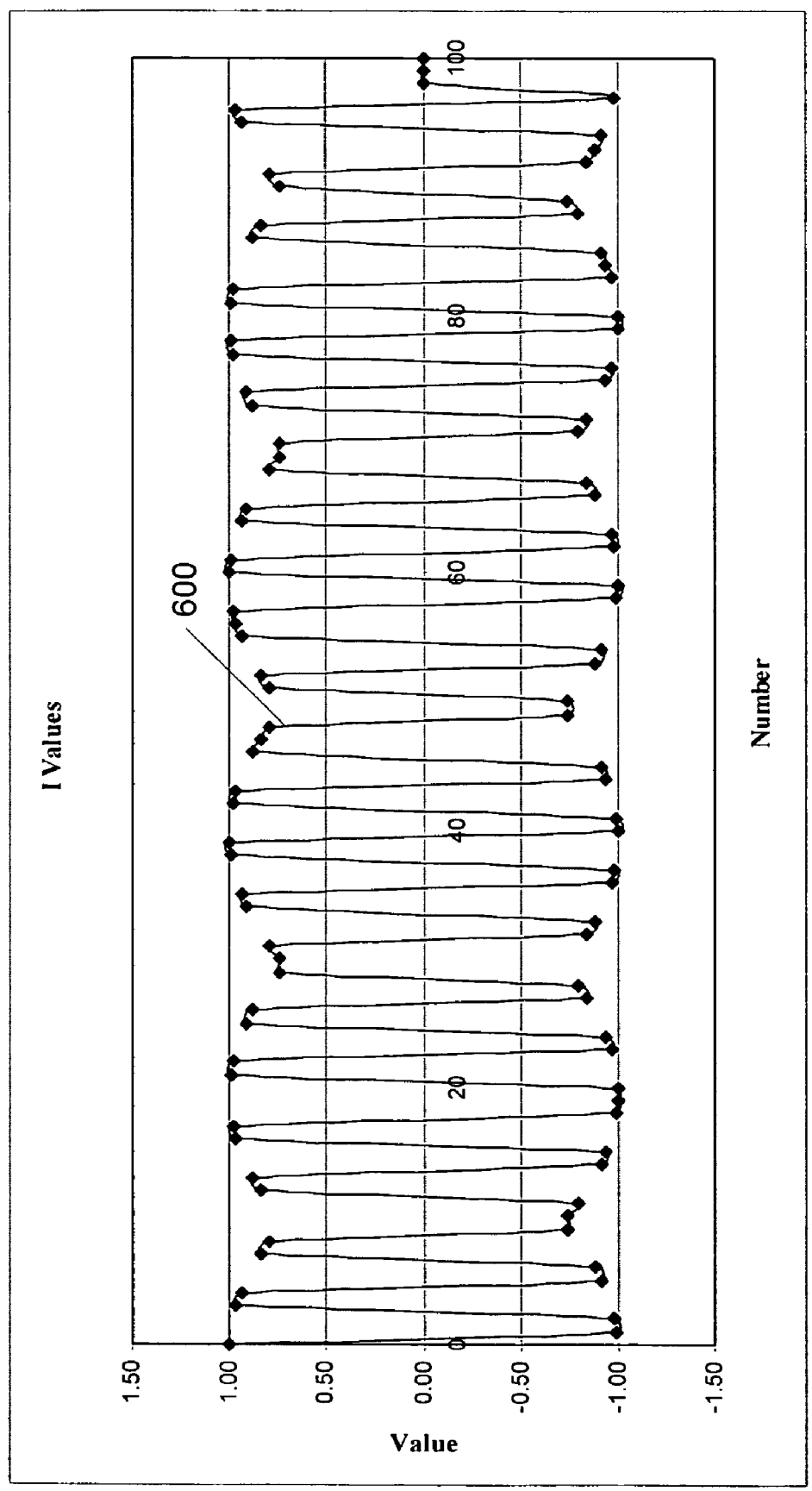
Figure 7:
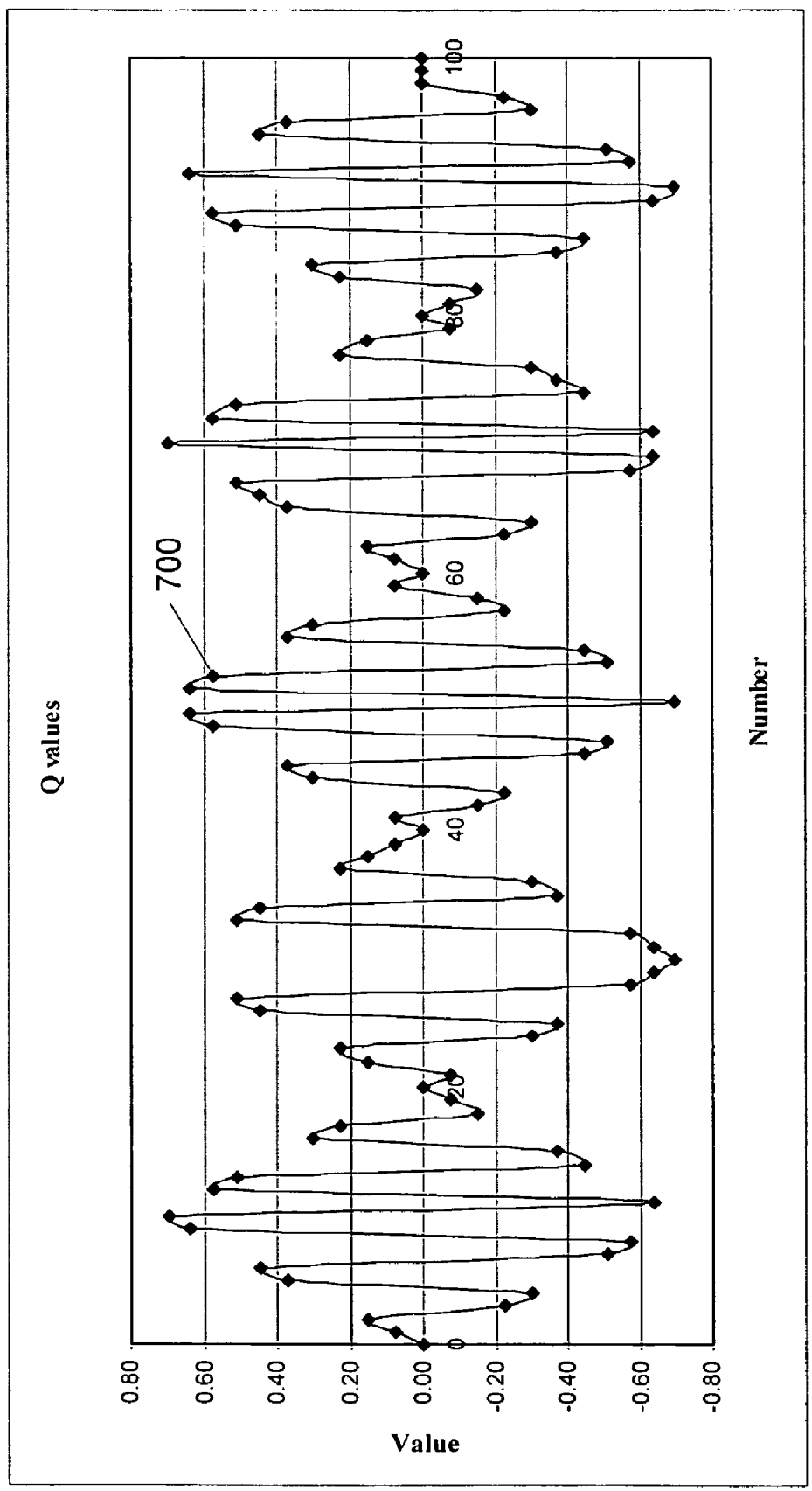
Figure 8:
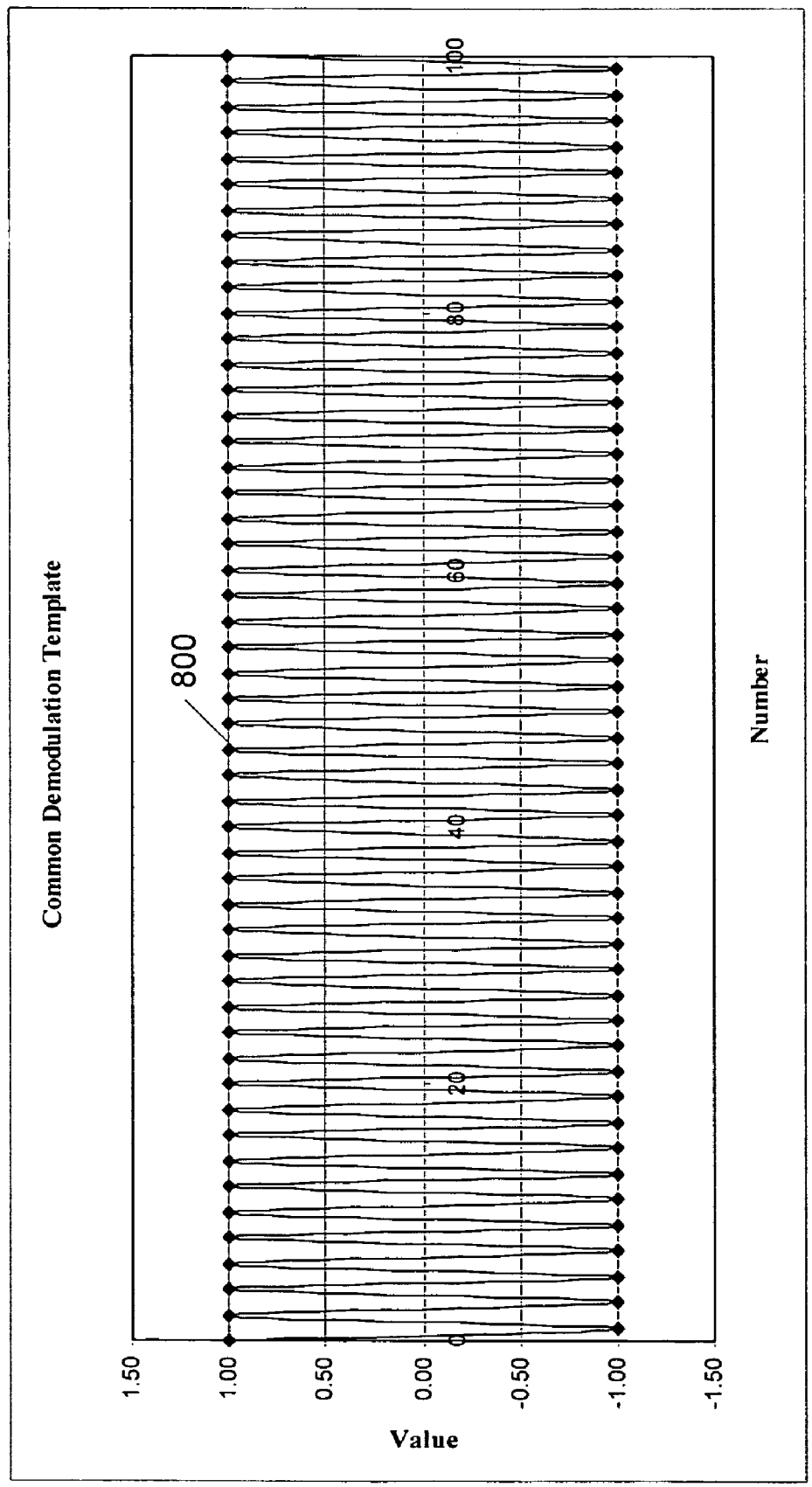
Figure 9:
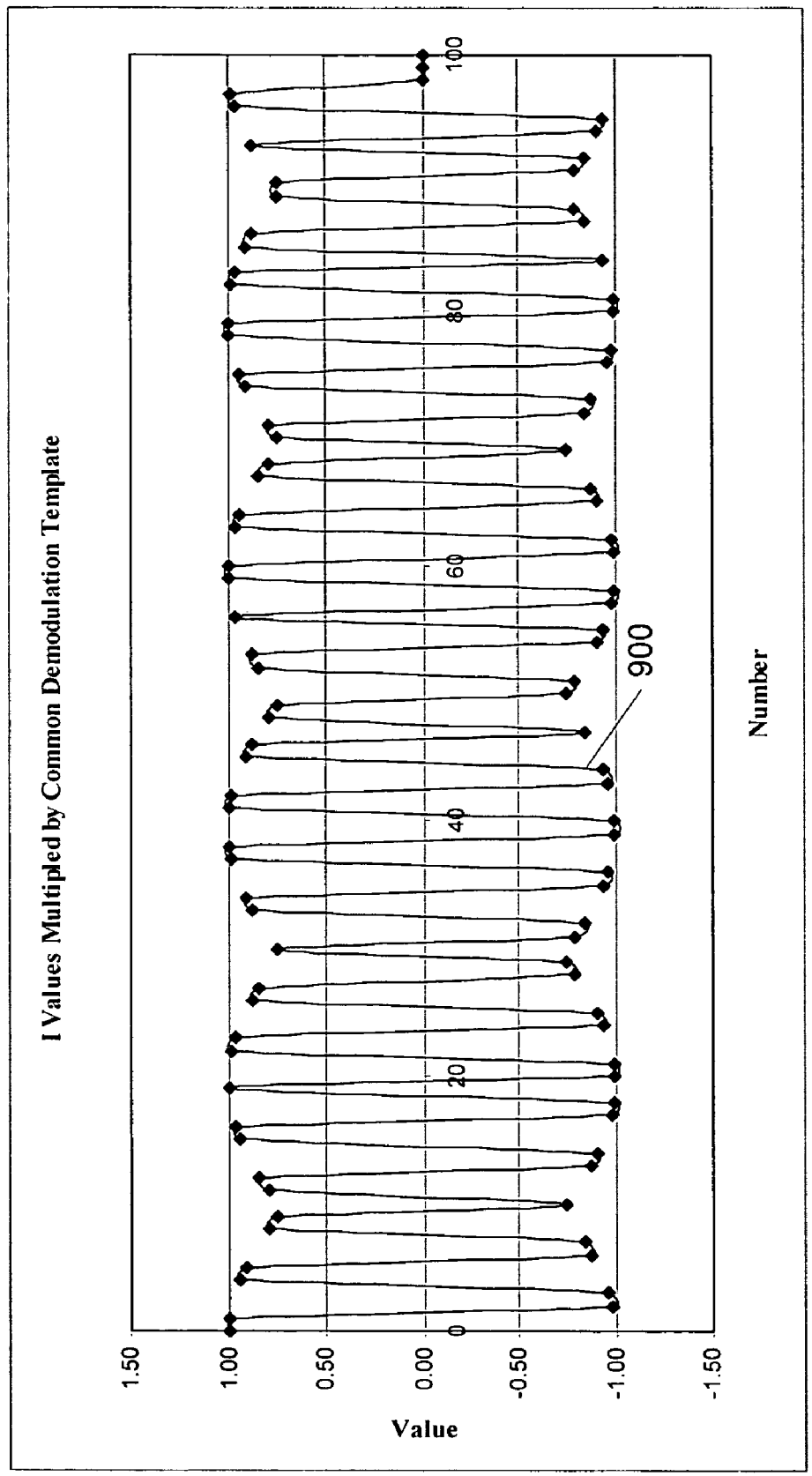
Figure 10:
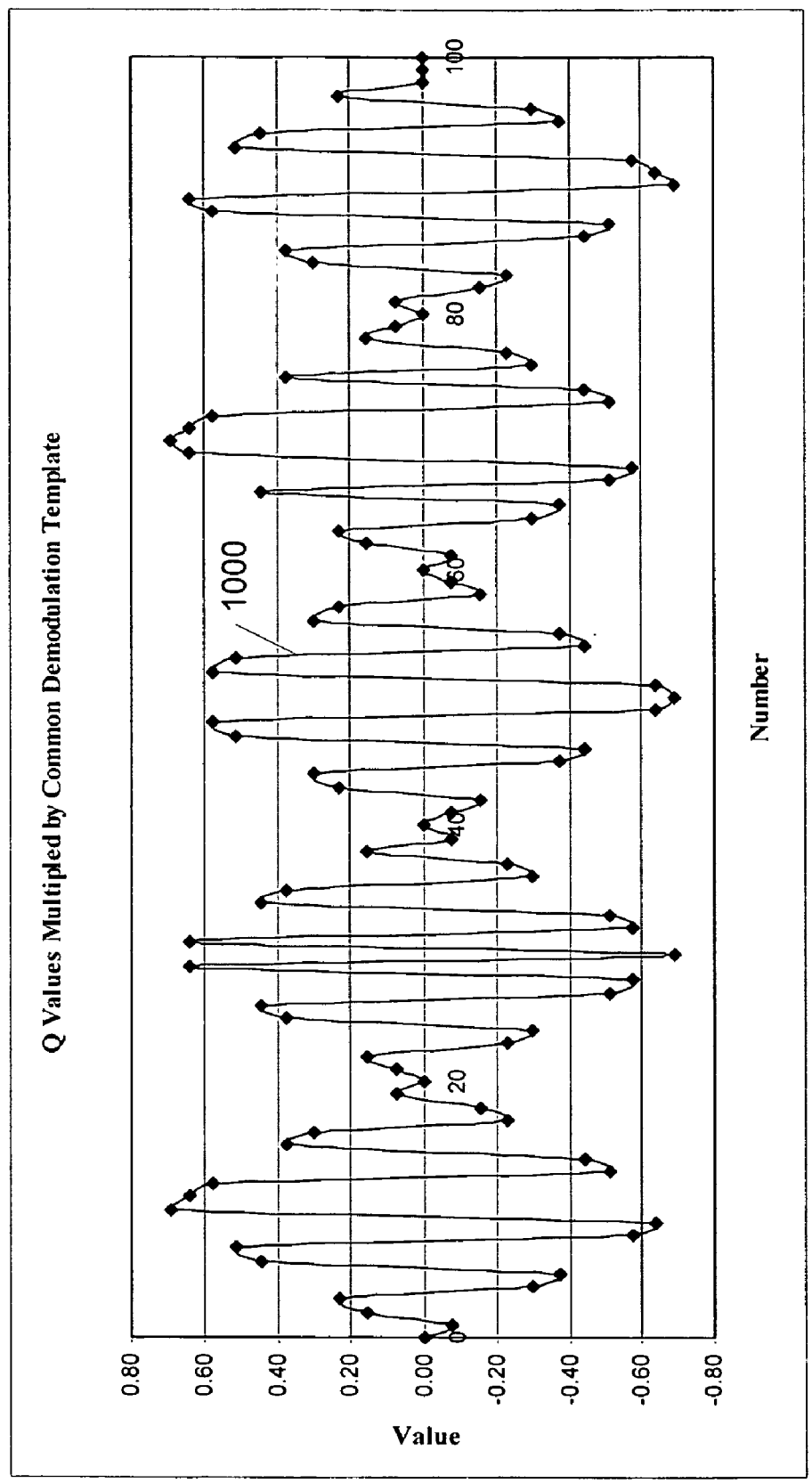
Figure 11:
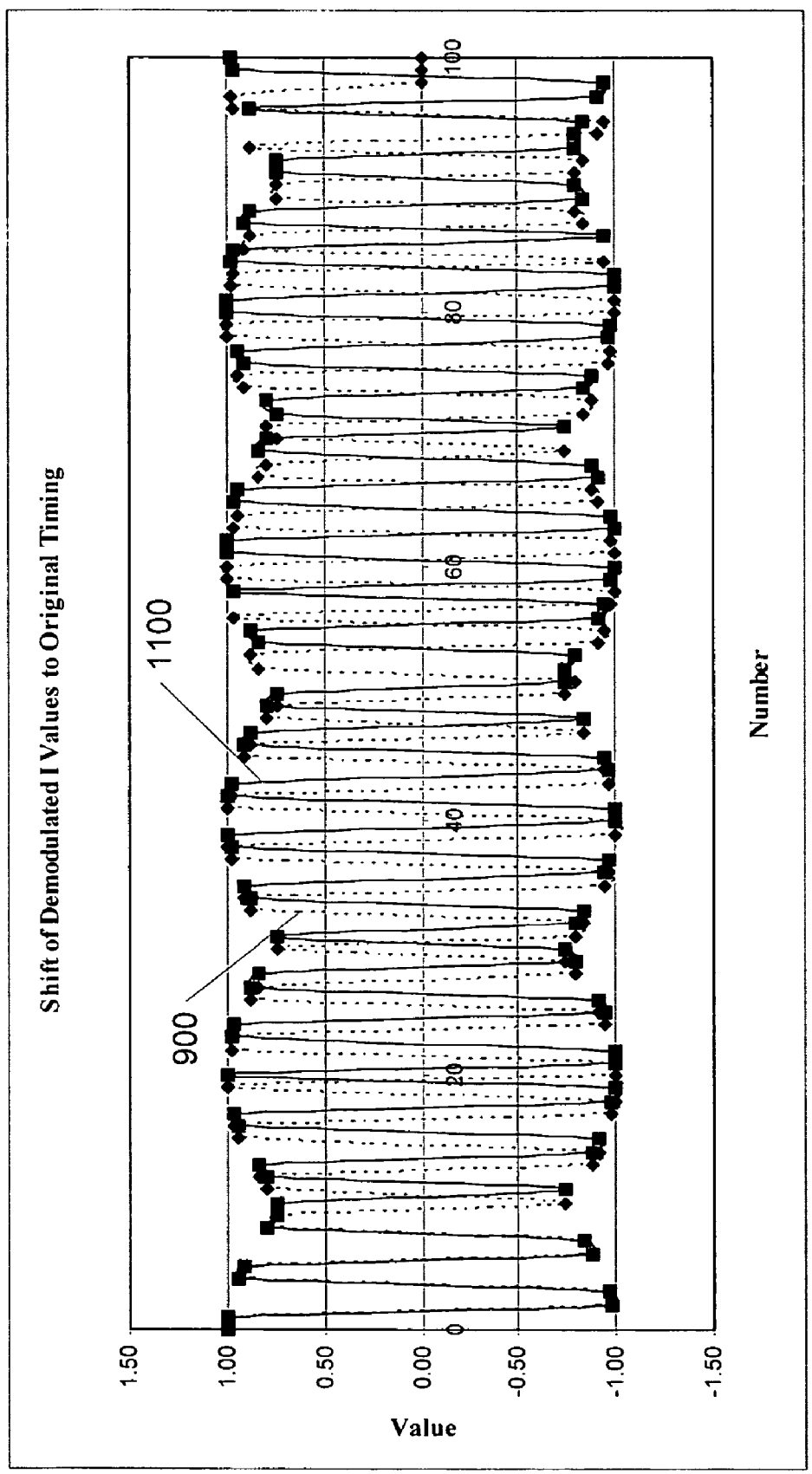
Figure 12:
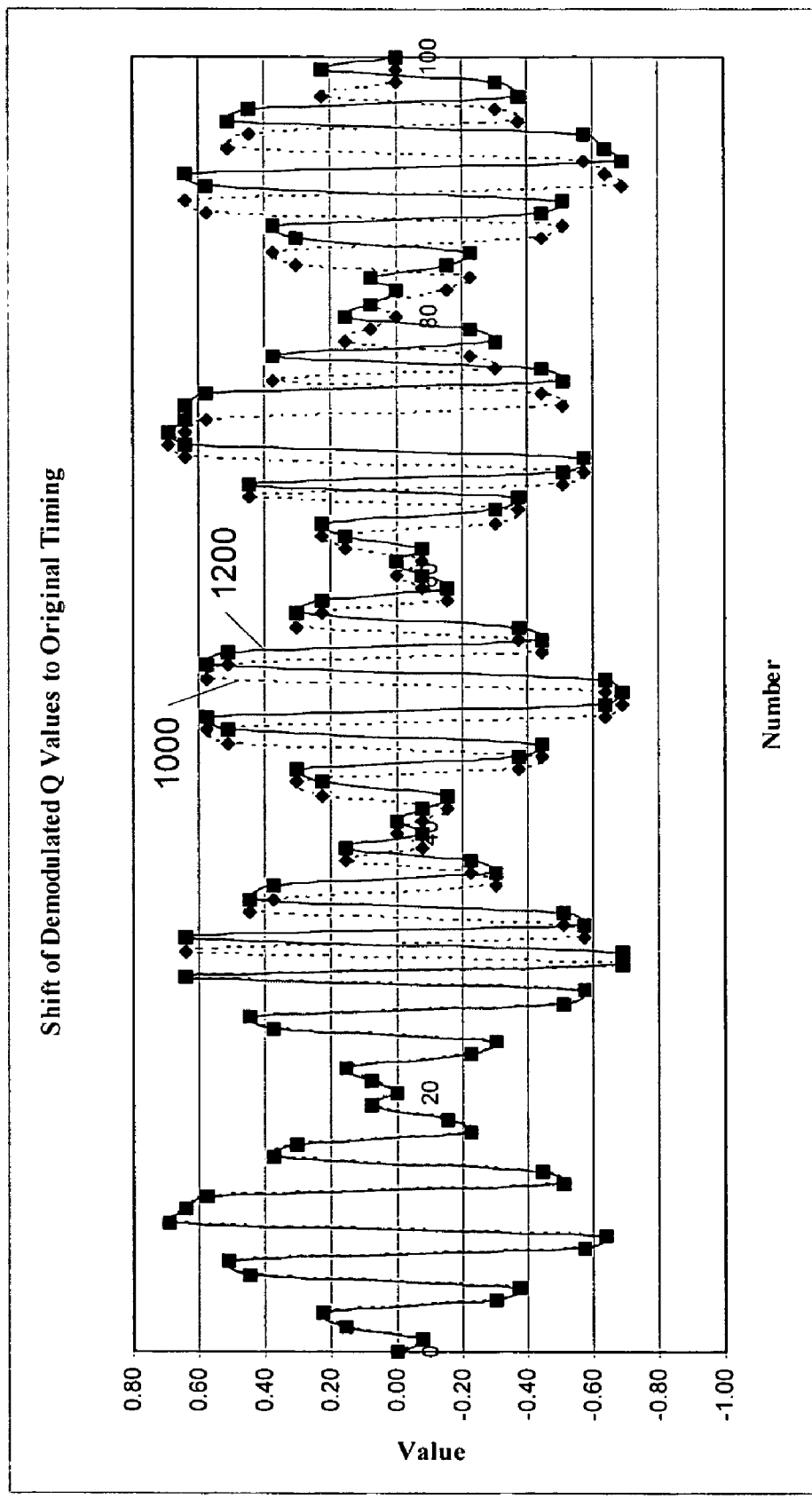

FIG. 8 illustrates a common sine demodulation template 800 that can now be applied to the I data set shown in FIG. 6. It will be appreciated that a corresponding cosine demodulation template that is applied to the Q data in FIG. 7 would look similar, excepted shifted one sample. Multiplying the respective I and Q data sets 600, 700 of FIGS. 6 and 7 by the respective sine and cosine demodulation templates produces the demodulated signal value sets 900 and 1000 shown in FIGS. 9 and 10, respectively. The demodulated signal value sets 900 and 1000 are next post-shifted to undo the effects of the pre-shifting. In the instant example, every $40^{th}$ sample is duplicated, yielding the shifted data sets 1100, 1200 shown in FIGS. 11 and 12.

A next step may be to process the data sets 1100, 1200 over a plurality of PN code period hypotheses. According to further aspects of the present invention, shifting and a common code template may be used to streamline this process.

Figure 13:
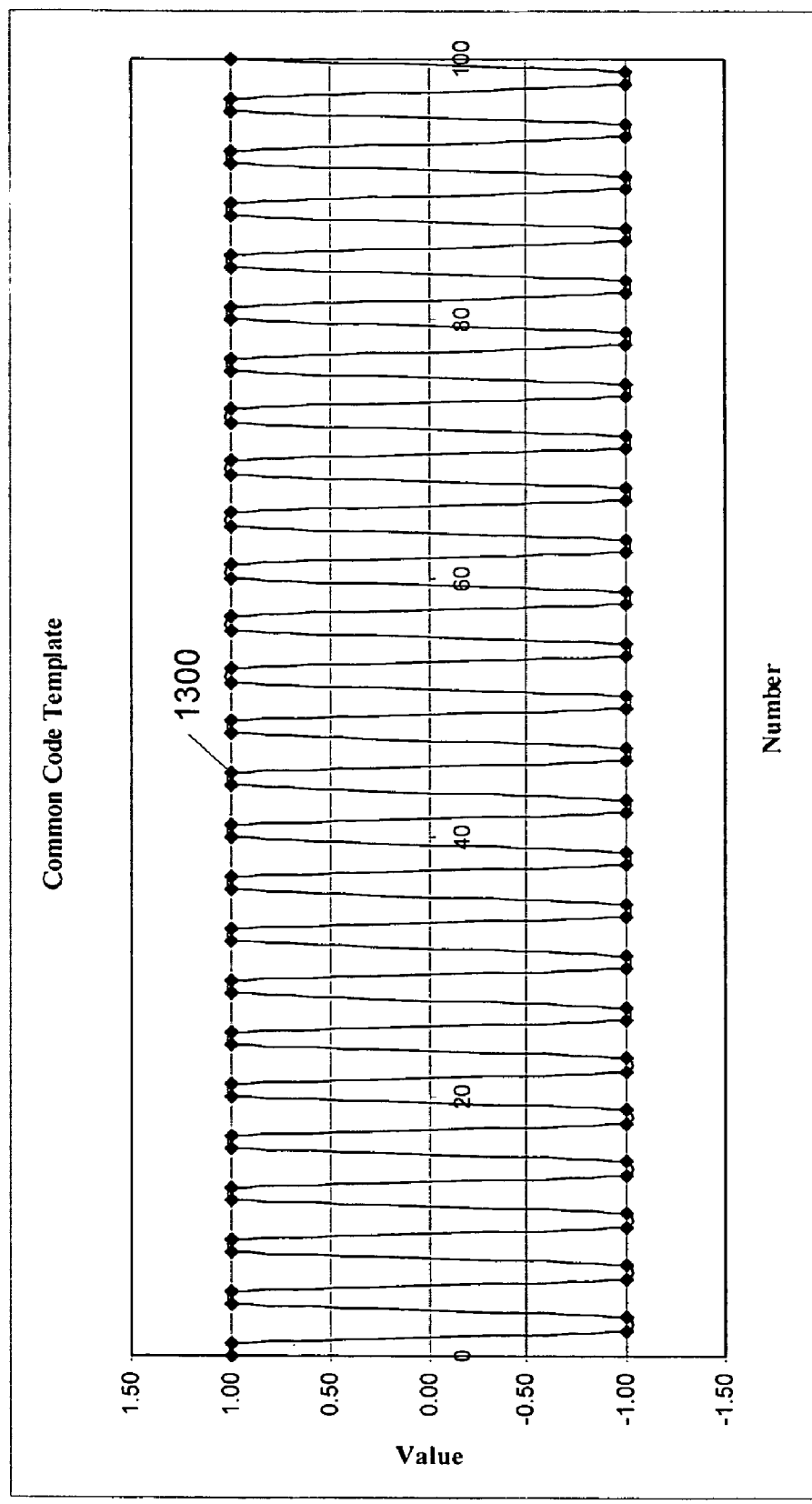
Figure 14:
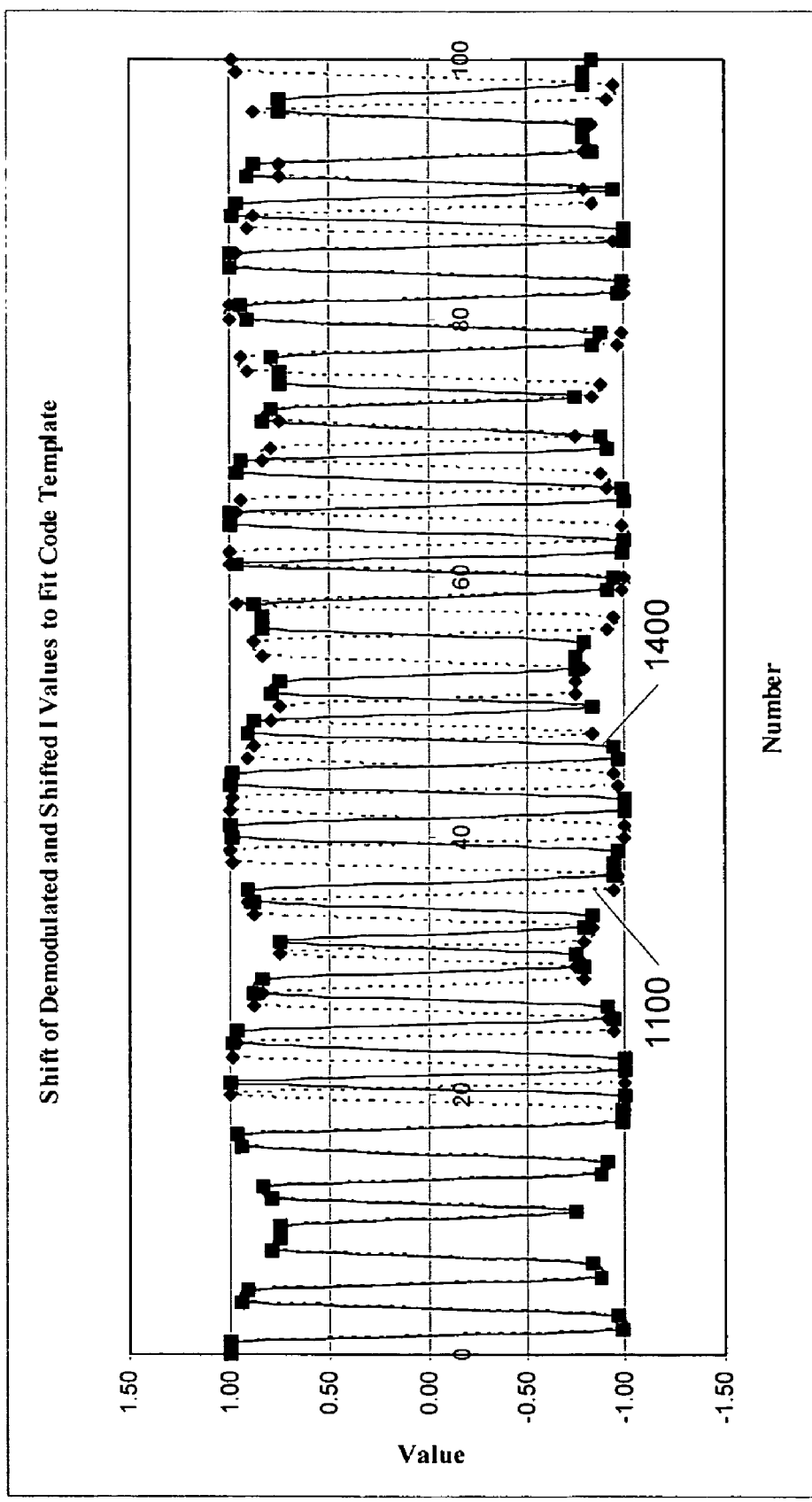
Figure 15:
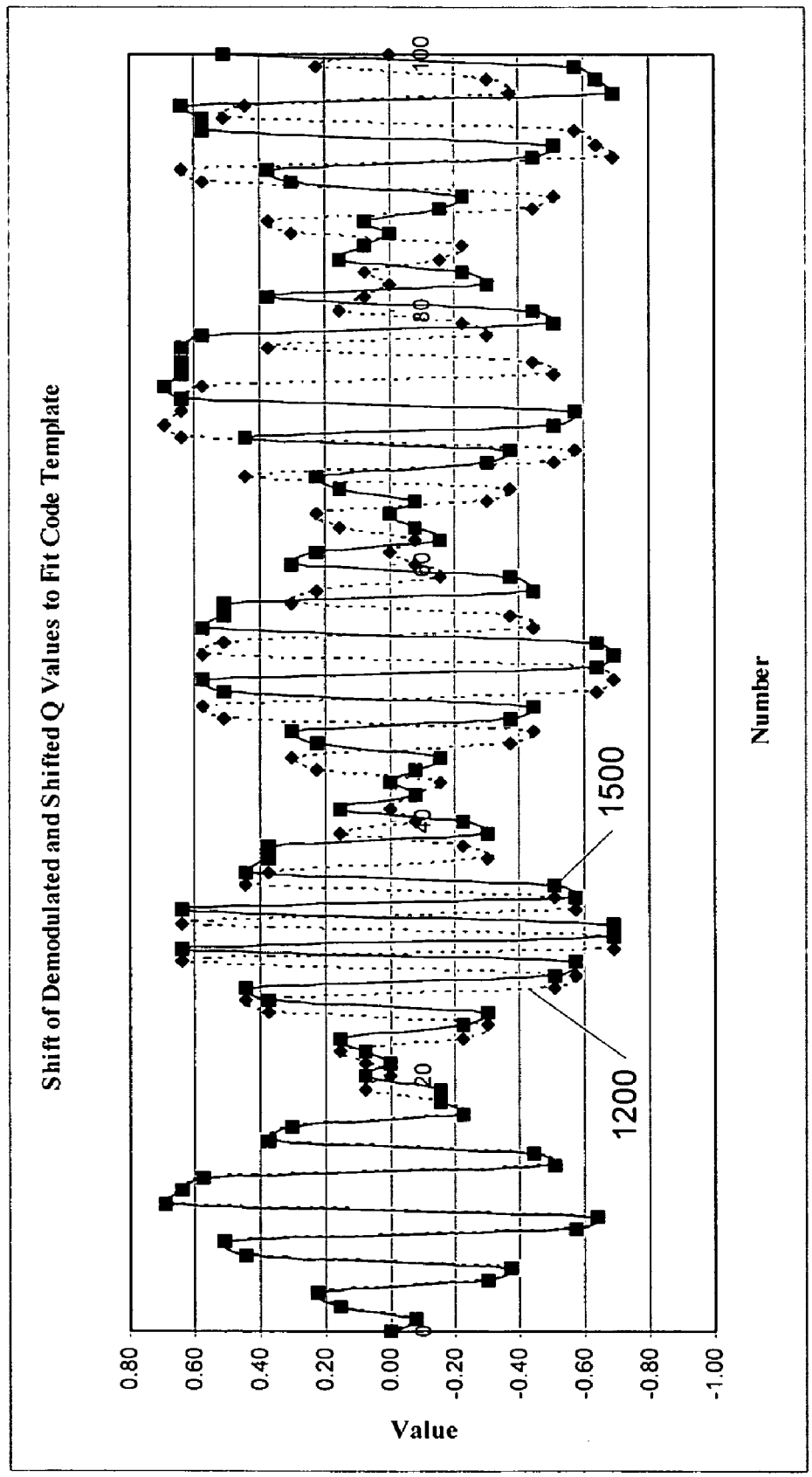

FIG. 13 illustrates a common code template 1300 with a period of 4T. As shown in FIGS. 14 and 15, assuming a (correct) code period hypothesis of 7.6T, the data sets 1100 and 1200 are shifted by duplicating every kth sample, where:

$$k = \frac{T_{c,h}}{T_{c,h} - T_{c,ref}}, \text{ and}$$

$T_{c,h}$ is the hypothetical code period (in this case, 7.6T) and $T_{c,ref}$ is the reference code period (in this case, 8T, representing a harmonic of the template period 4T). Thus, every $19^{th}$ sample is duplicated, producing shifted I and Q signal value sets 1400, 1500 shown in FIGS. 14 and 15.

Figure 16:
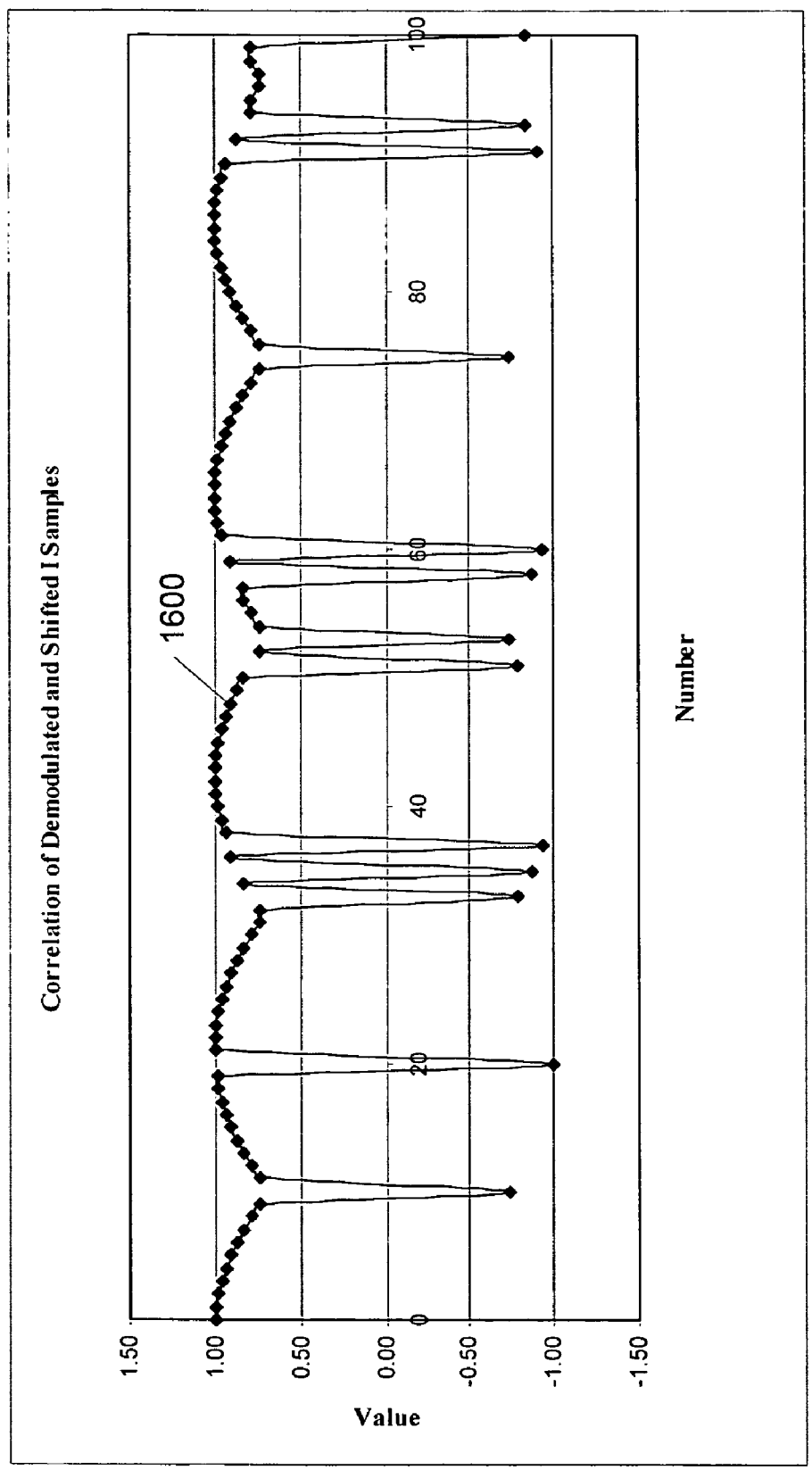
Figure 17:
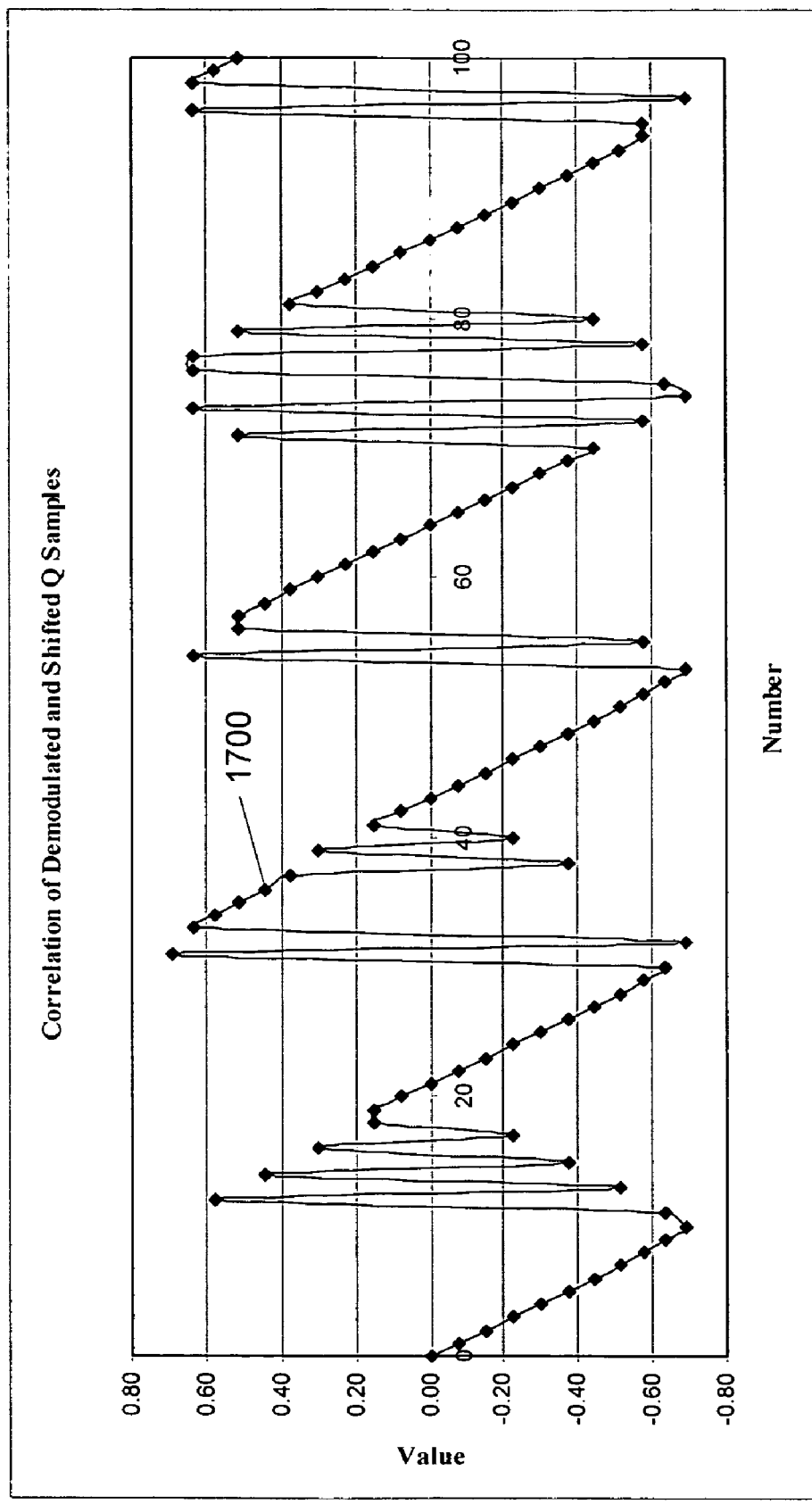

When the signal values sets 1400, 1500 shown in FIGS. 14 and 15 are multiplied by the common code template 1300 of FIG. 13 (assuming an accurate hypothesis of the code starting point), the correlation data 1600, 1700 shown in FIGS. 16 and 17 are produced. For the illustrated example of FIGS. 4-17, the IF period, code period and code phase hypotheses were all accurate (correct), producing a high degree of correlation. In particular, the data set 1600 has an average value of 0.70, and the data set 1700 has an average value of 0.07. The RSS of the two values is 0.70. It will be appreciated that less accurate hypotheses should produce lesser correlation.

It will be understood that, when the modulation starting point is not known, the correlation operation described above may use multiple starting points of the modulation template to find the maximum correlation. It may be sufficient to use starting points on chip edge boundaries and at the midpoints of the chip. This is analogous to I and Q positions, but in the code modulation domain, instead of the IF carrier domain.

Figure 18:
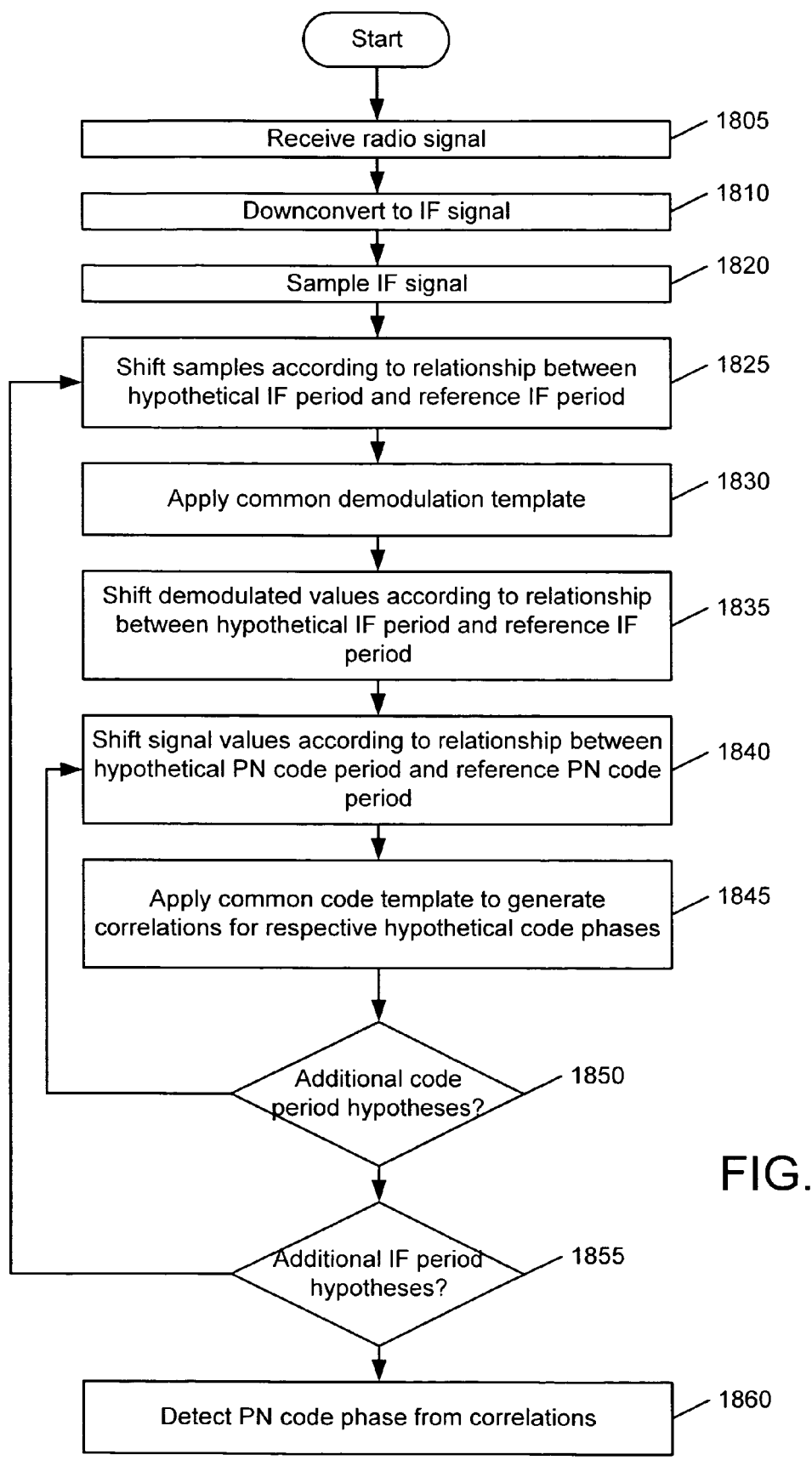
FIGS. 18-20 are flowcharts illustrating exemplary operations for detecting a target modulation according to various embodiments of the present invention.

FIG. 18 illustrates exemplary operations for GPS PN code phase detection according to further embodiments of the present invention. A radio signal is received, for example, at a cellular handset or other GPS-enabled device (block 1805). The received signal is downconverted to IF and sampled (blocks 1810, 1820). The samples are shifted according to a relationship between a hypothetical IF period and a reference IF period (block 1825). A common IF demodulation template is then applied to the shifted samples (block 1830). The resulting demodulated signal values are the shifted to undo time distortion of the previous shift (block 1835).

Entering into an inner loop, the demodulated values are then evaluated for a plurality of PN code period hypotheses. The demodulated values are shifted according to a relationship between a PN code period hypothesis and a reference PN code period associated with a common PN code demodulation template (block 1840). Respective correlations of the shifted demodulated values with respective phases of the PN code template are then determined (block 1845). This process is repeated for each of a plurality of code period hypotheses (blocks 1840-1850) for the given IF period hypothesis. The demodulation and correlation processes (1825-1850) are repeated for each IF period hypothesis. Once correlations for all the IF period hypotheses have been generated (block 1855), the PN code phase of the received signal may be determined from the generated correlations (block 1860).

Additional efficiencies may be gained by combining techniques along the lines described above with other code search streamlining techniques. For example, a copending U.S. patent application Ser. No. 10/919,174, entitled Apparatus, Methods and Computer Program Products for GPS Signal Acquisition Using an Adaptive Search Engine, filed Aug. 16, 2004 and incorporated herein by reference in its entirety, describes search techniques in which a flexible processing structure suited for use in a DSP or similar computing device may be used to adaptively modify a code phase and IF frequency search space to increase efficiency and/or accuracy. Such techniques may be implemented using demodulation and correlation processing techniques along the lines described above. A U.S. patent application Ser. No. 10/919,154, entitled Apparatus, Methods and Computer Program Products for Positioning System Signal Processing Using Parallel Computational Techniques, filed Aug. 16, 2004 and incorporated herein by reference in its entirety, describes streamlined techniques for correlation processing using single bit arithmetic that could be combined with techniques according to embodiments of the present invention and/or with the techniques described in the aforementioned U.S. patent application Ser. No. 10/919,174.

According to further embodiments of the present invention, carrier and code timing hypotheses may be evaluated without the signal value shifting described above, while still limiting the number of demodulation templates used to test the various hypotheses by generating demodulation templates from a set of kernel demodulation templates according to relationships between the timing hypotheses and a reference timing. In particular, various carrier timing hypotheses (e.g., various Doppler shifts) may be evaluated by generating carrier demodulation templates from a set of kernel templates.

Figure 19:
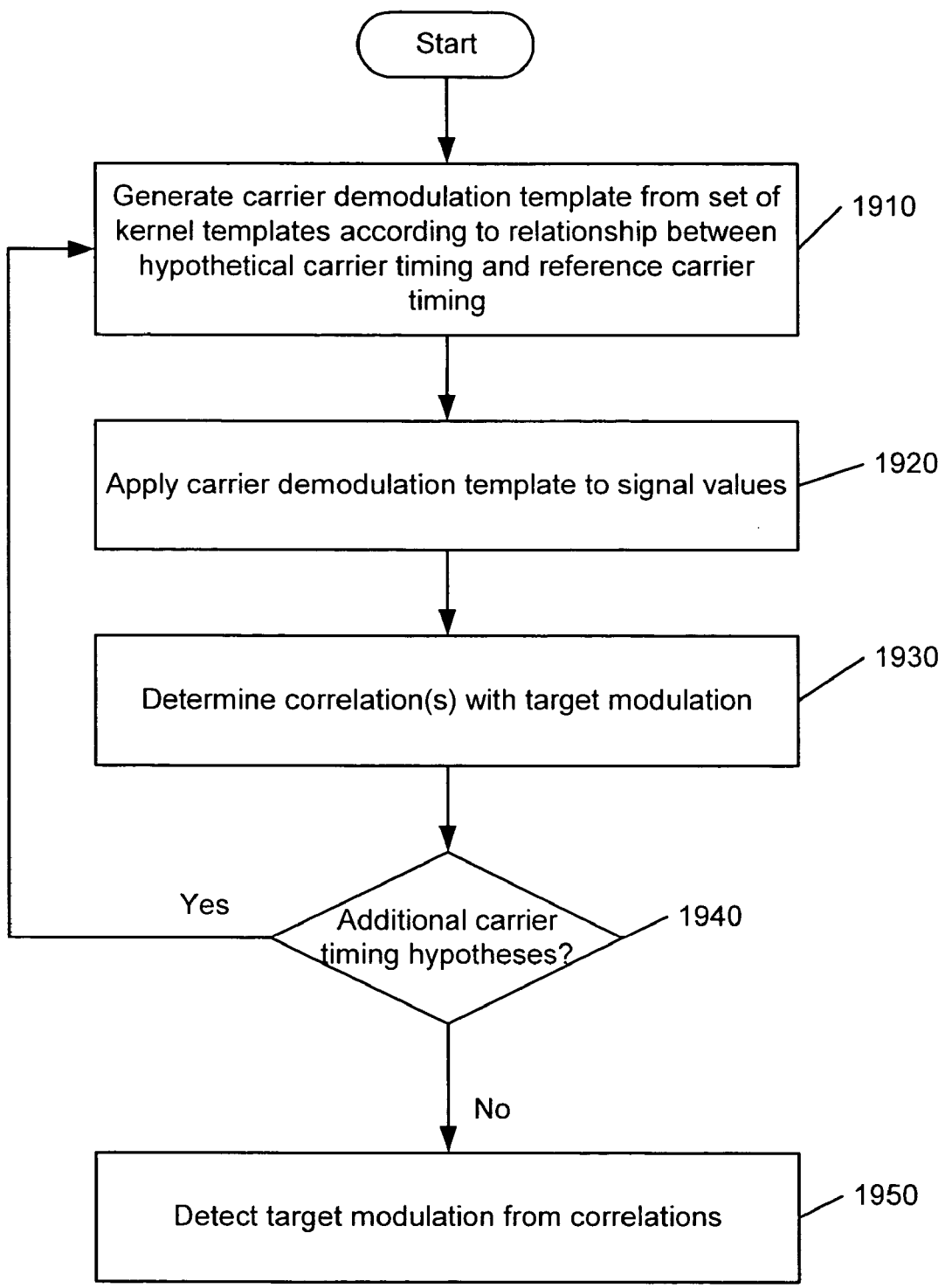

Referring to FIG. 19, in some embodiments of the present invention, a target modulation (e.g., a GPS PN code) is detected using a set of common carrier demodulation kernel templates. A carrier demodulation template for a particular carrier timing hypothesis is generated from a set of kernel templates according to a relationship between the carrier timing hypothesis and a reference carrier timing (block 1910). The generated carrier demodulation template is then applied to signal values (block 1920). One or more correlations of the demodulated signal values for the given carrier timing hypotheses are then determined by, for example, correlating the demodulated signal values with time-shifted versions of the target modulation (block 1930). If additional carrier timing hypotheses are to be evaluated (block 1940), the template generation, demodulation and correlation operations (blocks 1910, 1920, 1930) are repeated for the new carrier timing hypothesis. Once correlations have been generated for all the carrier timing hypotheses, the target modulation is detected (block 1940). For example, detection may involve comparing correlation metrics (e.g., L1 or L2 metrics) generated from the various correlations.

Figure 20:
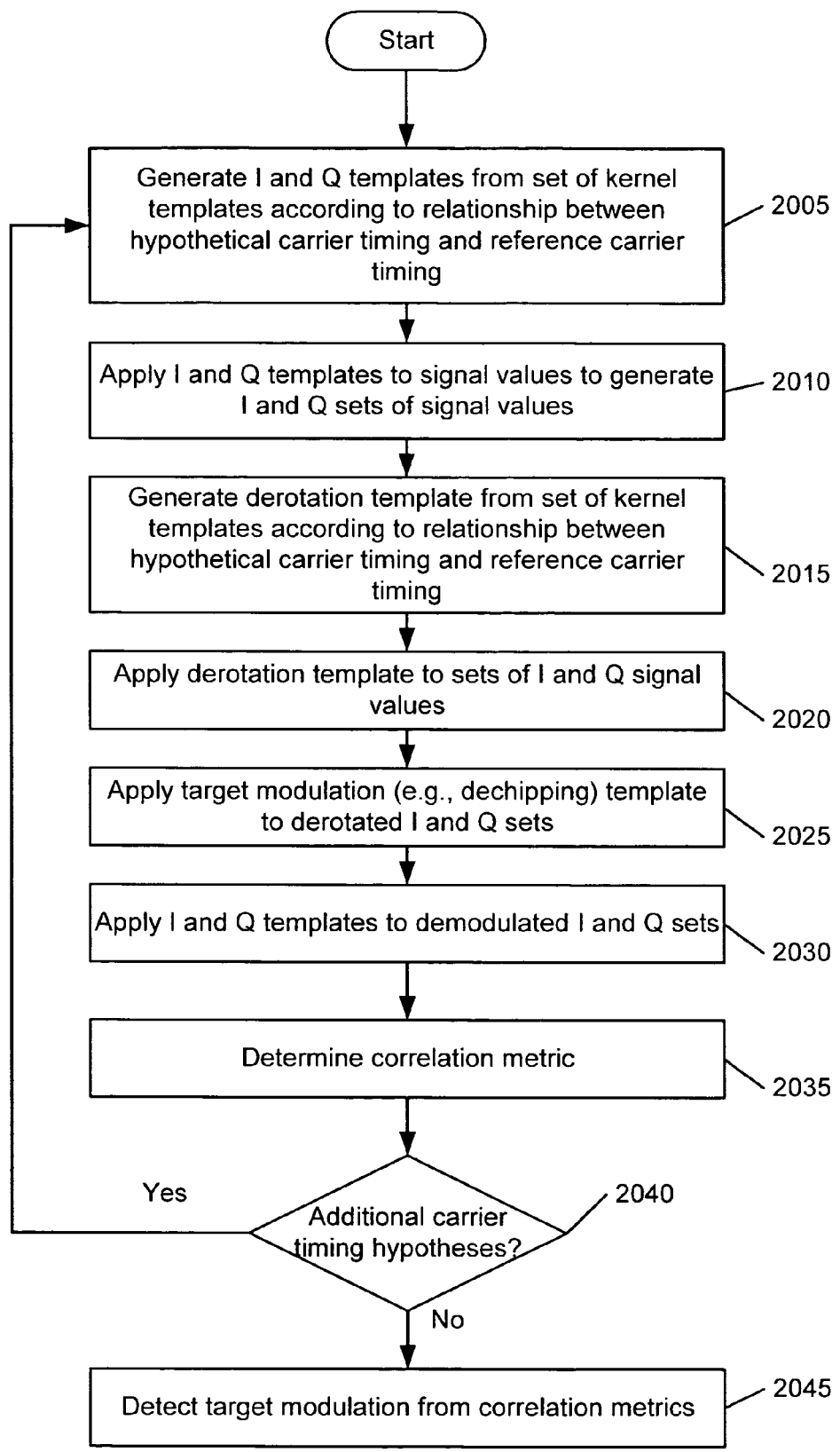

FIG. 20 illustrates exemplary operations for target modulation detection according to further embodiments of the present invention. I and Q templates for a given carrier timing hypothesis are generated from a common set of kernel templates according to a relationship between the hypothetical carrier timing and a reference carrier timing (block 2005). The I and Q templates are applied to signal values to generate I and Q sets of signal values (block 2010). A derotation template is constructed from a set of kernel templates according to the relationship between the hypothetical carrier timing and the reference carrier timing (block 2015). The derotation template is applied to the I and Q sets of signal values (block 2020). A target modulation template (e.g., a "dechipping" template) is applied to the derotated I and Q signal value sets to produce I and Q sets of demodulated signal values (block 2030). The I and Q templates are applied to the I and Q sets of demodulated signal values (block 2030), and a correlation metric is generated from the result (block 2035). If an additional carrier timing hypothesis remains to be evaluated, the operations of blocks 2005-2035 are repeated for the new carrier timing hypothesis. After correlation metrics have been generated for each carrier timing hypothesis, the target modulation is detected from the correlation metrics (block 2045).

An application of the operations of FIG. 20 for detecting a chipping (PN) code in an exemplary signal, as might be done in an GPS PN code search, will now be described with reference to FIGS. 21-37. For the illustrated example, it is assumed that a nominal or reference IF period is 4 times the signal sampling period T. It will be appreciated that this reference IF period may correspond, for example, for a nominal IF period in the absence of a satellite-motion-induced Doppler shift. In the illustrated example, signal values and templates are quantized to 1-bit values, along lines described in the aforementioned U.S. patent application Ser. No. 10/919,154. This allows various carrier demodulation and dechipping operations to be achieved using relatively simple bitwise logical operations.

Figure 21:
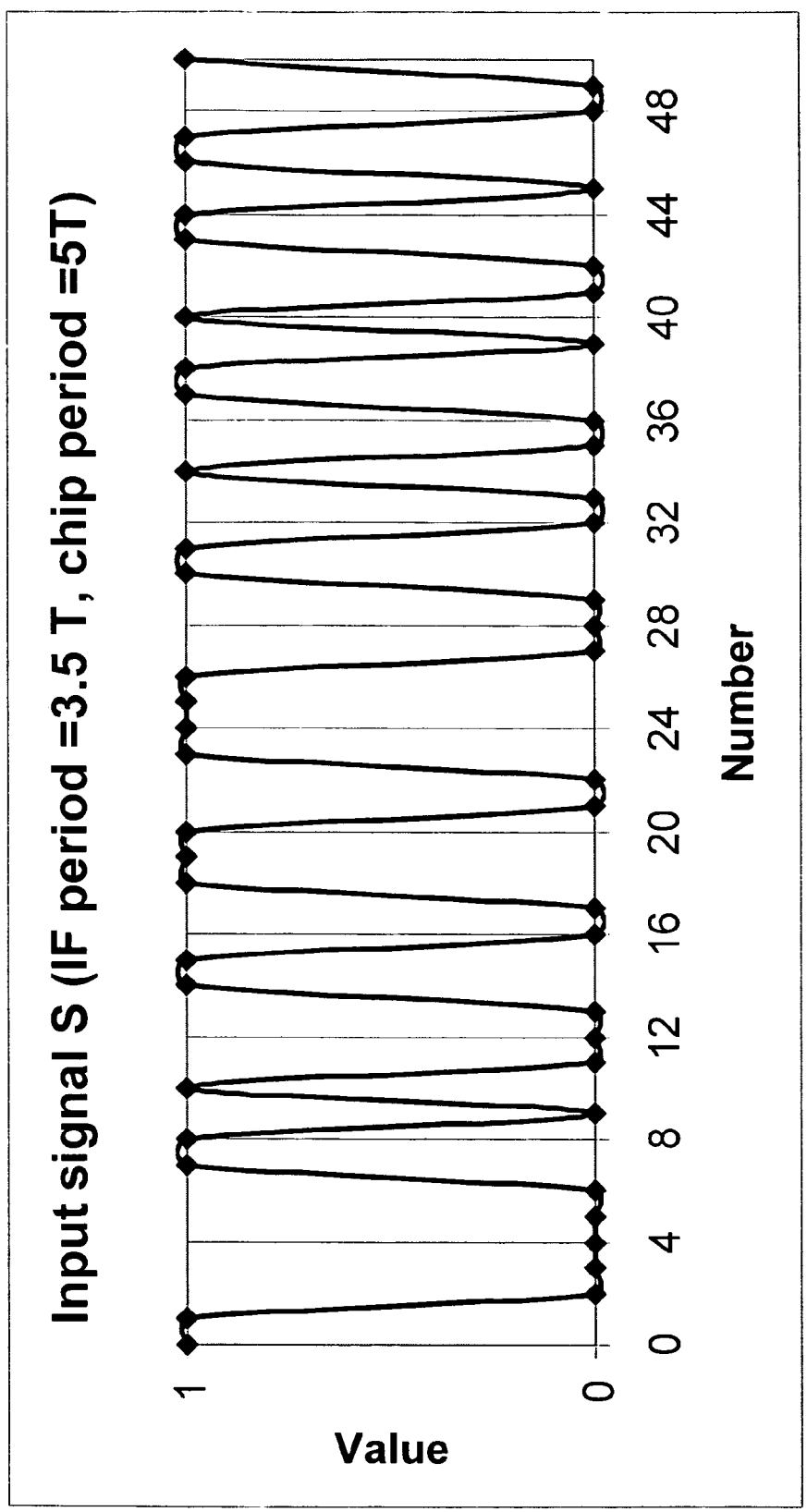
FIGS. 21-35 are signal diagrams illustrating exemplary operations for detecting a target modulation according to some embodiments of the present invention.

The exemplary signal S is illustrated in FIG. 21, and has an IF (carrier) period of 3.5 times the signal sampling period T, i.e., the exemplary signal S has a slightly shorter period than a nominal IF period of 4 times the sampling period T, which may be attributable, for example, to a Doppler shift. In the following discussion, it is assumed that the PN code has a period of 5 times the sampling period T, and that it is desired to evaluate a (correct) IF period hypothesis of 3.5T.

Because the IF period hypothesis is 3.5T, I and Q templates to be applied to the signal S are shifted accordingly. This may be achieved by generating the I and Q templates from a set of common kernel templates, in this case, a template 1 with the four-bit value 1010 and a template 2 with the four-bit value 1010, based on a relationship between the hypothesized IF period (3.5T) and the nominal or reference IF period (4T). In particular, the I and Q templates may be generated by changing between templates 1 and 2 every m signal values, where:

$$m = T_{IF,nominal} \times \left( \frac{1}{T_{IF,nominal} - T_{IF,hypothetical}} \right) = 4T\left(\frac{1}{0.5T}\right) = 8.$$

Figure 22:
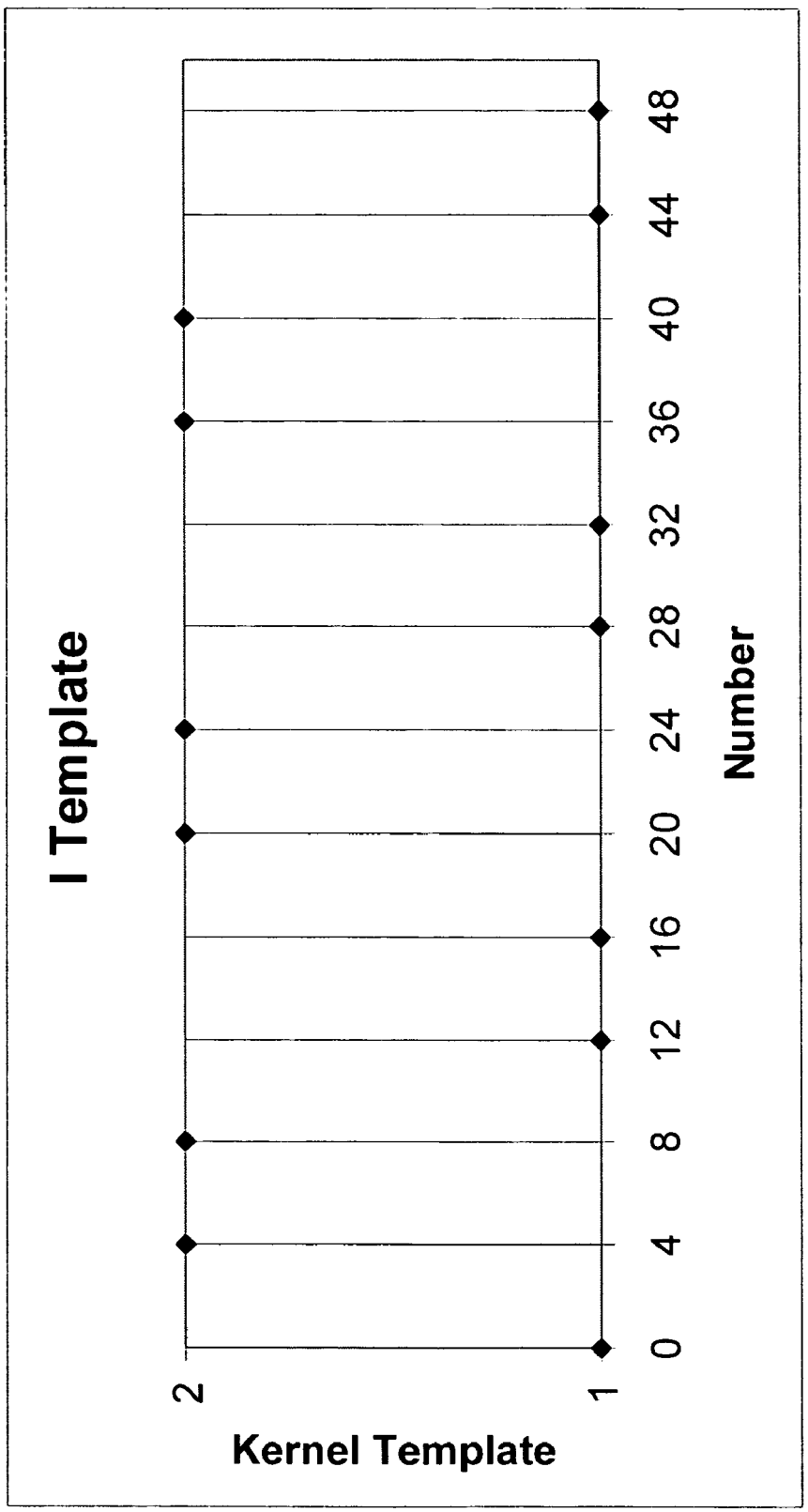
Figure 23:
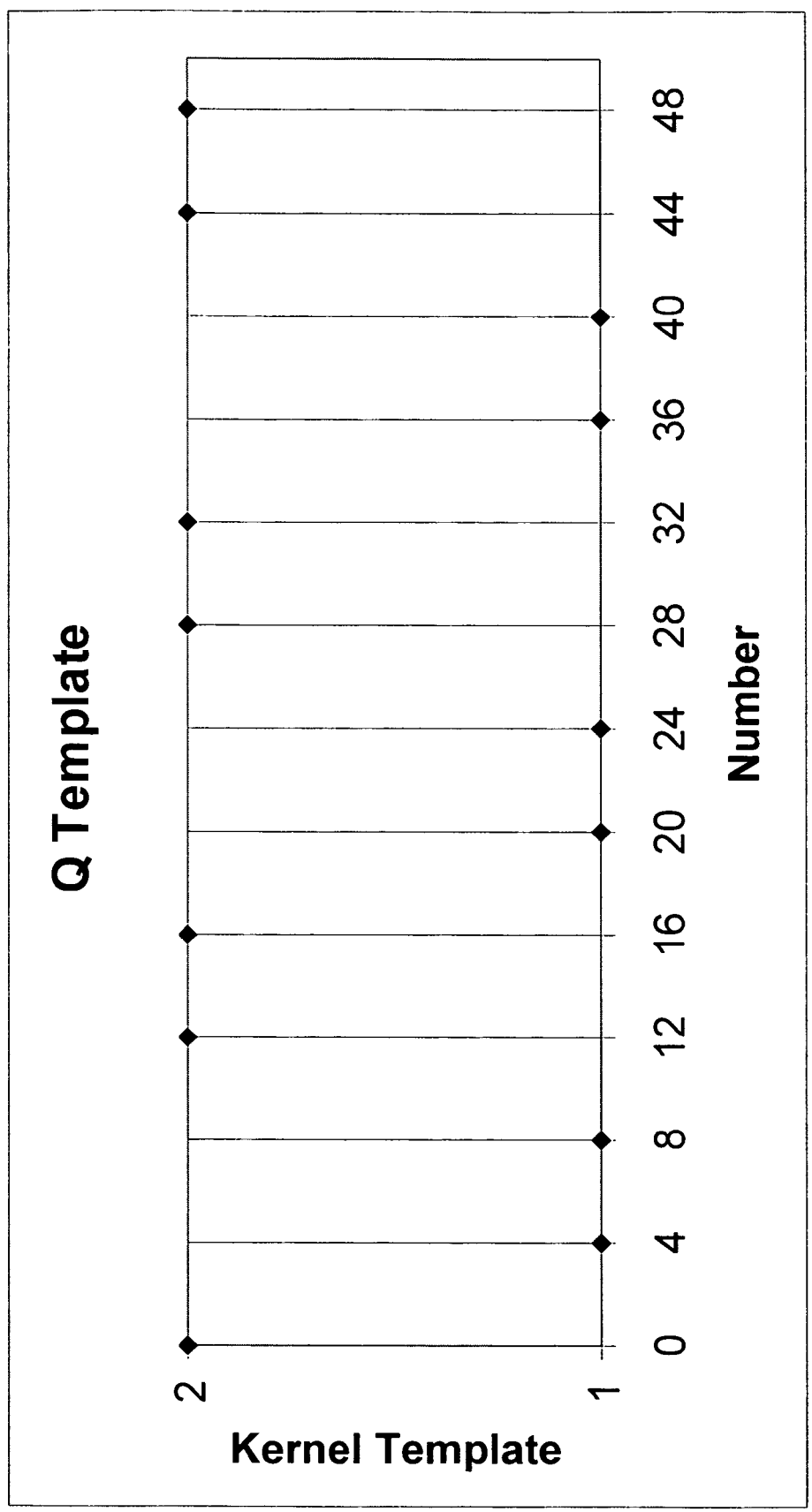
Figure 24:
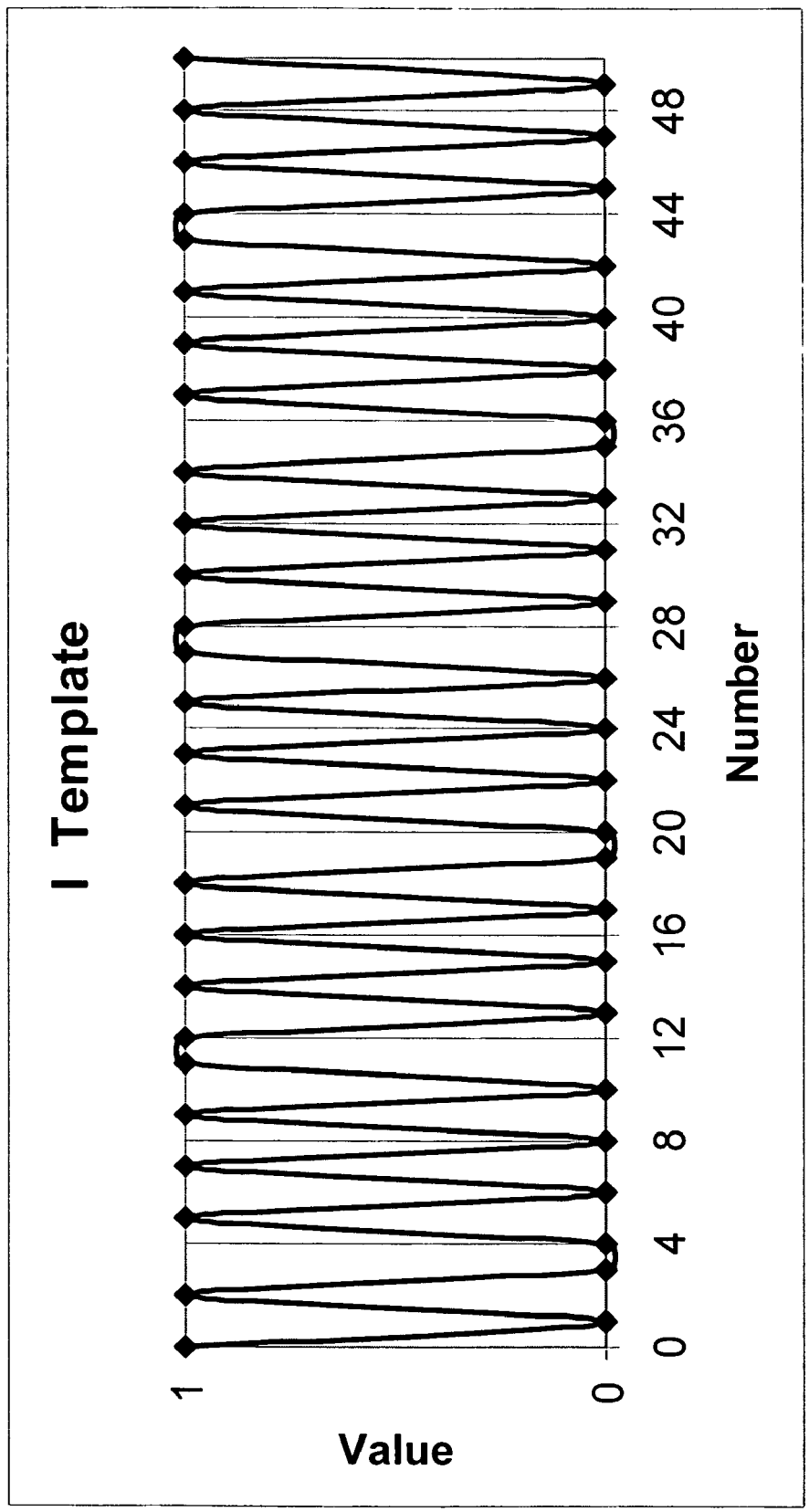
Figure 25:
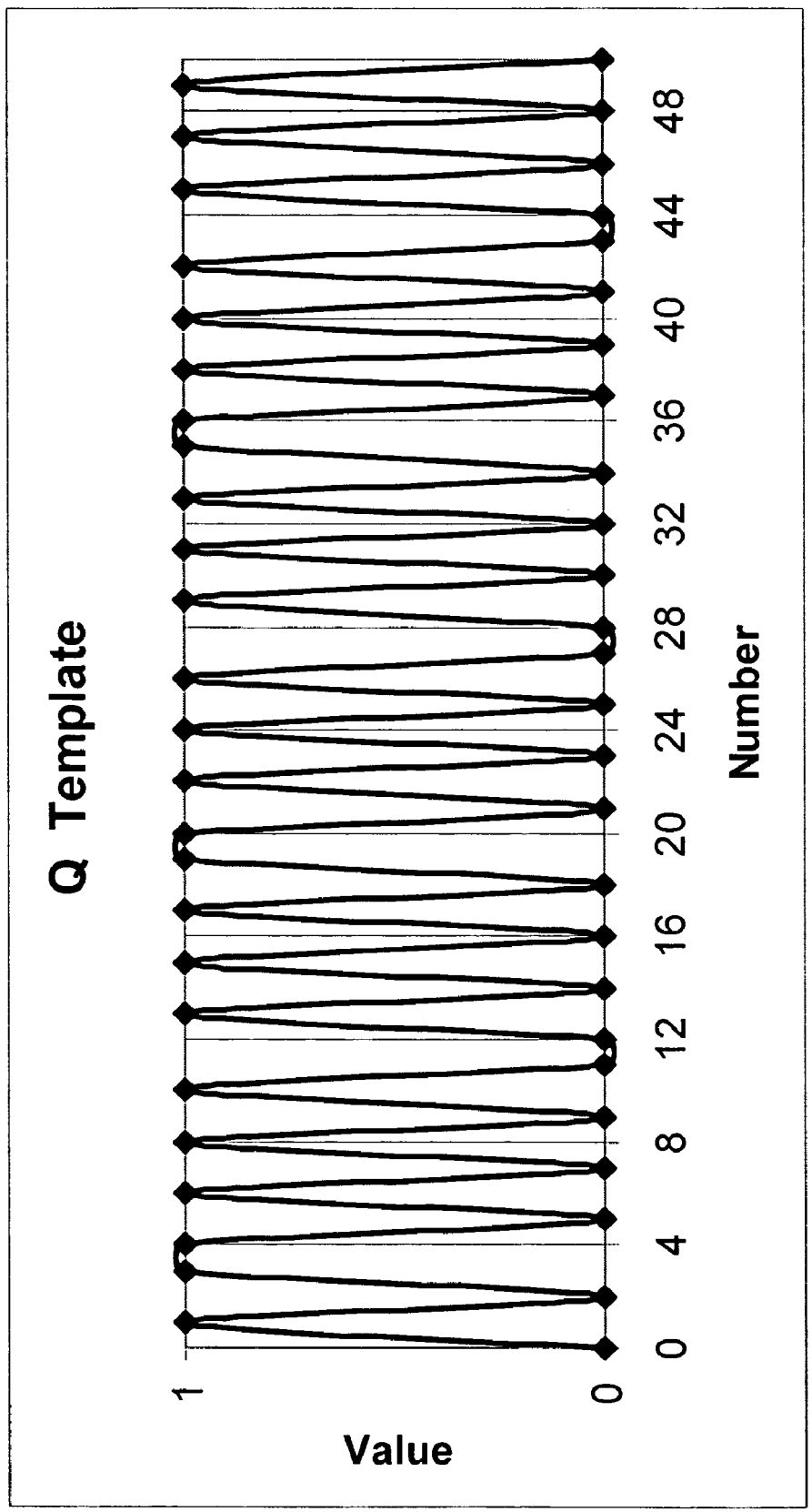

Thus, as shown in FIG. 22, the I template starts with template 1 (1010) at signal value number 0, and changes to template 2 (1010) at signal value number 4. Template 2 is repeated at signal value number 8, but the template is again changed to template 1 at signal sample number 12. This process is repeated to generate the I template shown in FIG. 24. As can be seen in FIG. 24, the result is equivalent to removing every $8^{th}$ value from a "reference" I template (101010 . . . ). Referring to FIGS. 23 and 25, as similar process is used to generate a Q template.

Figure 26:
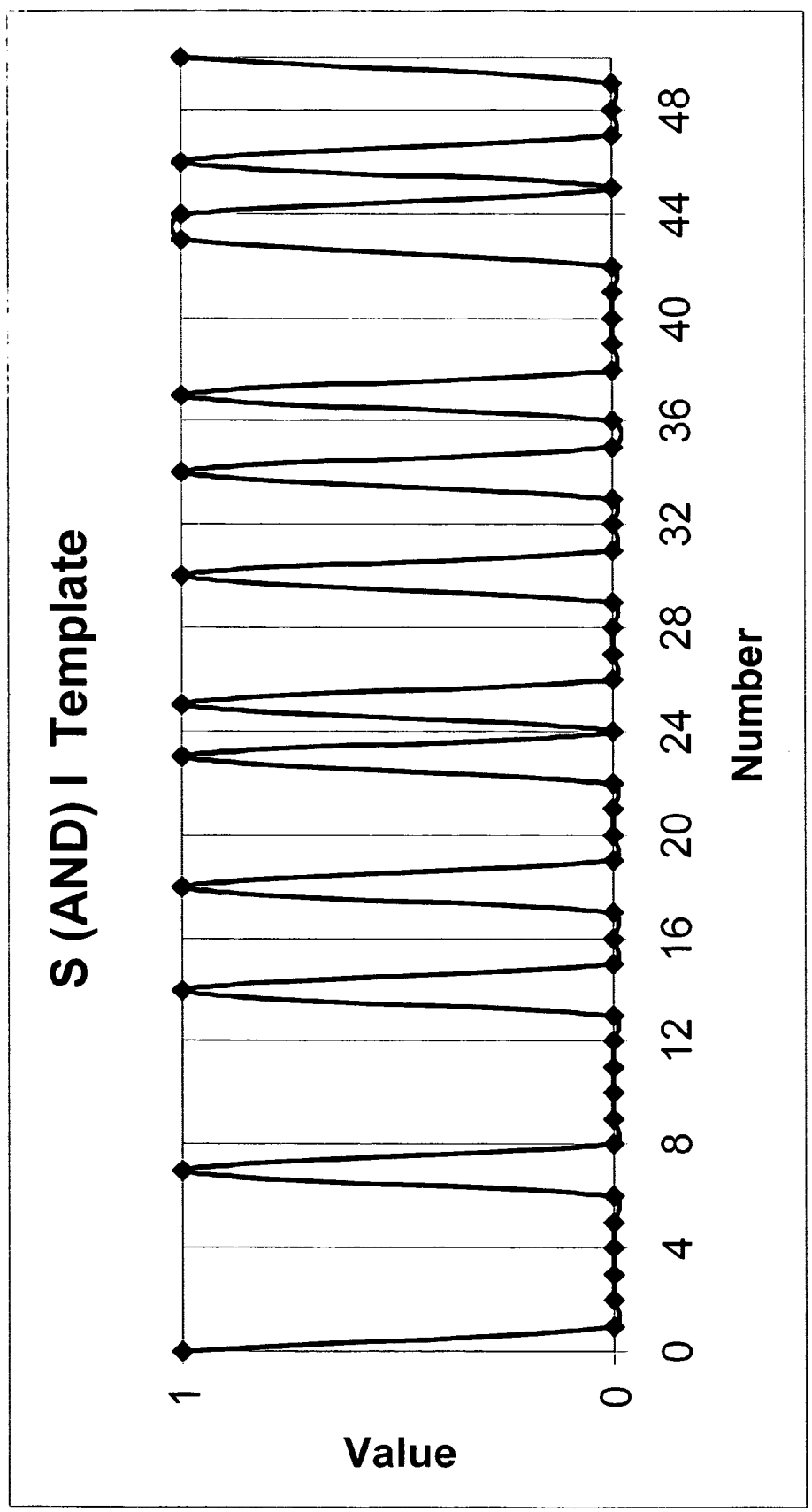
Figure 27:
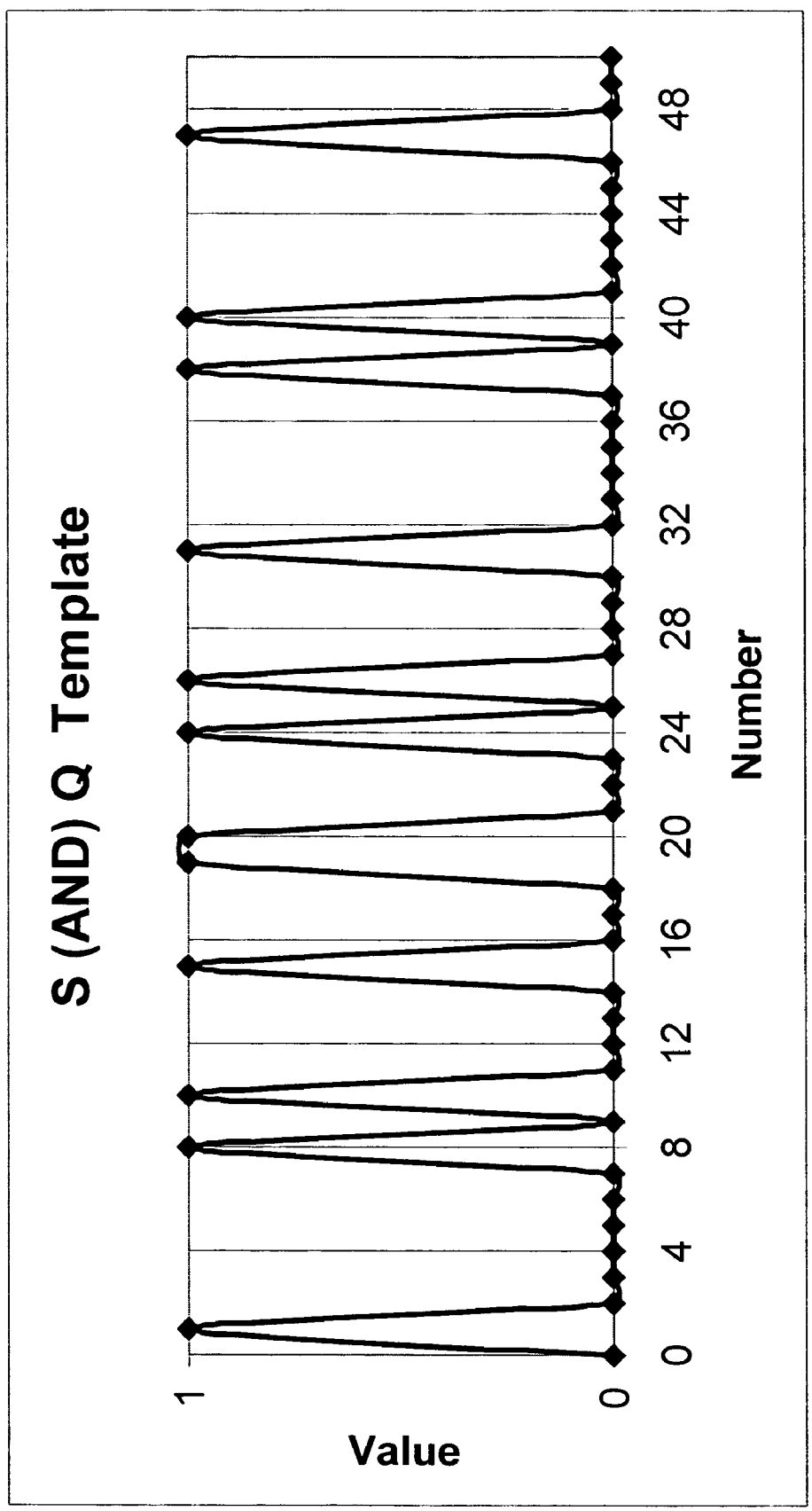

Referring to FIGS. 26 and 27, the generated I and Q templates are then applied to the signal S to generate I and Q signal value sets. In particular, the I and Q templates are logically ANDed with the signal S to generate the I and Q signal value sets shown in FIGS. 26 and 27.

Figure 28:
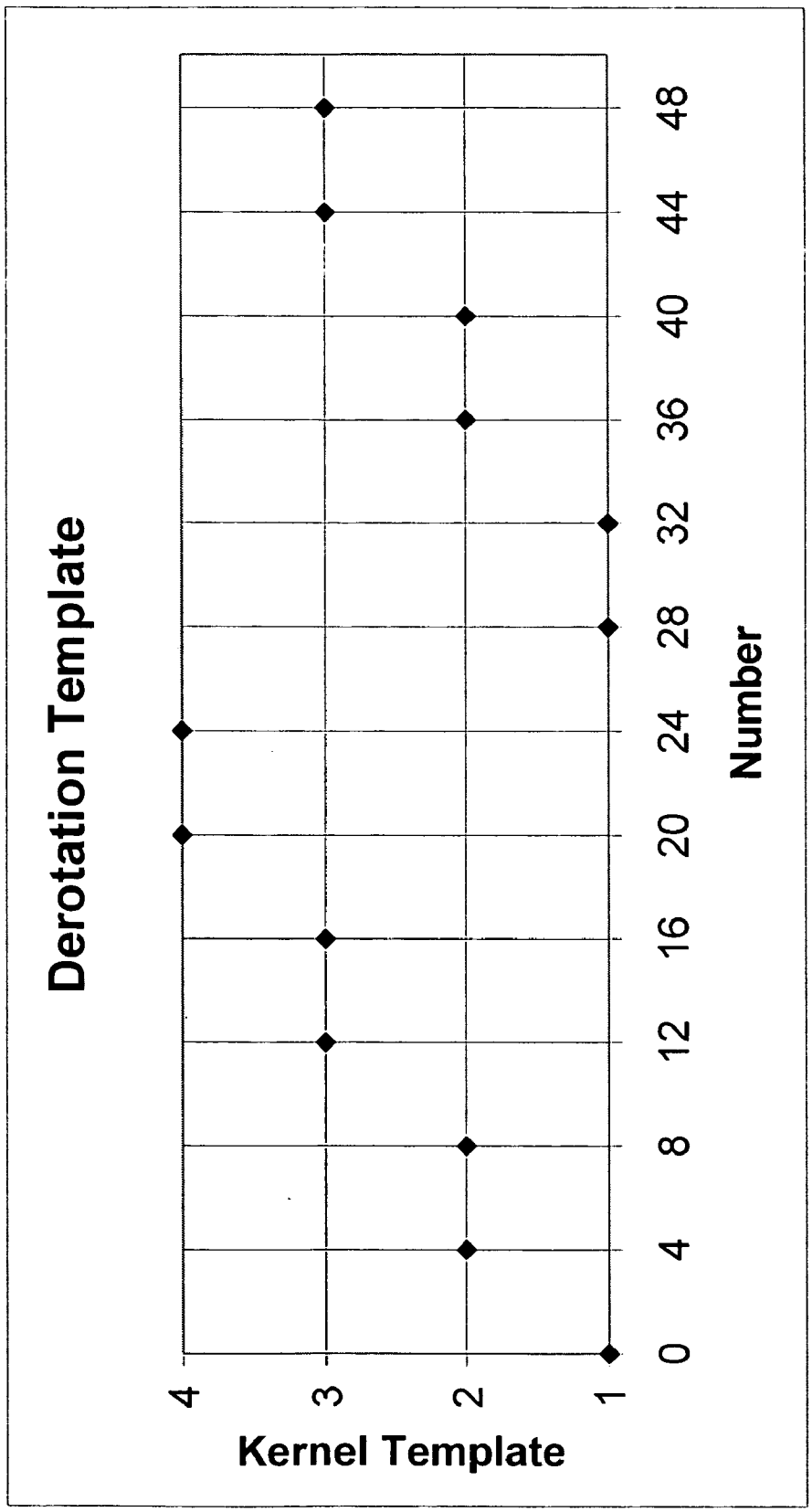
Figure 29:
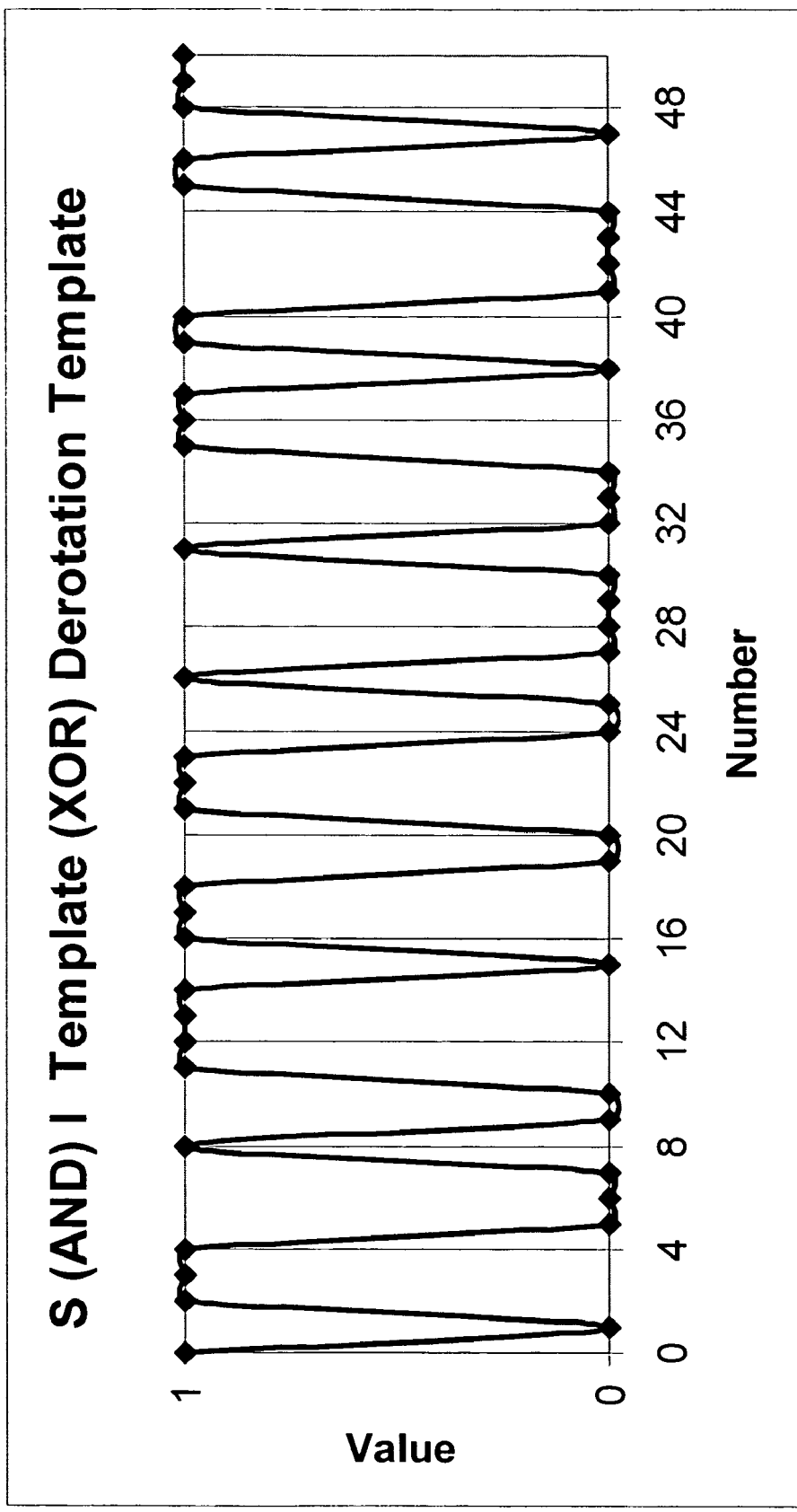
Figure 30:
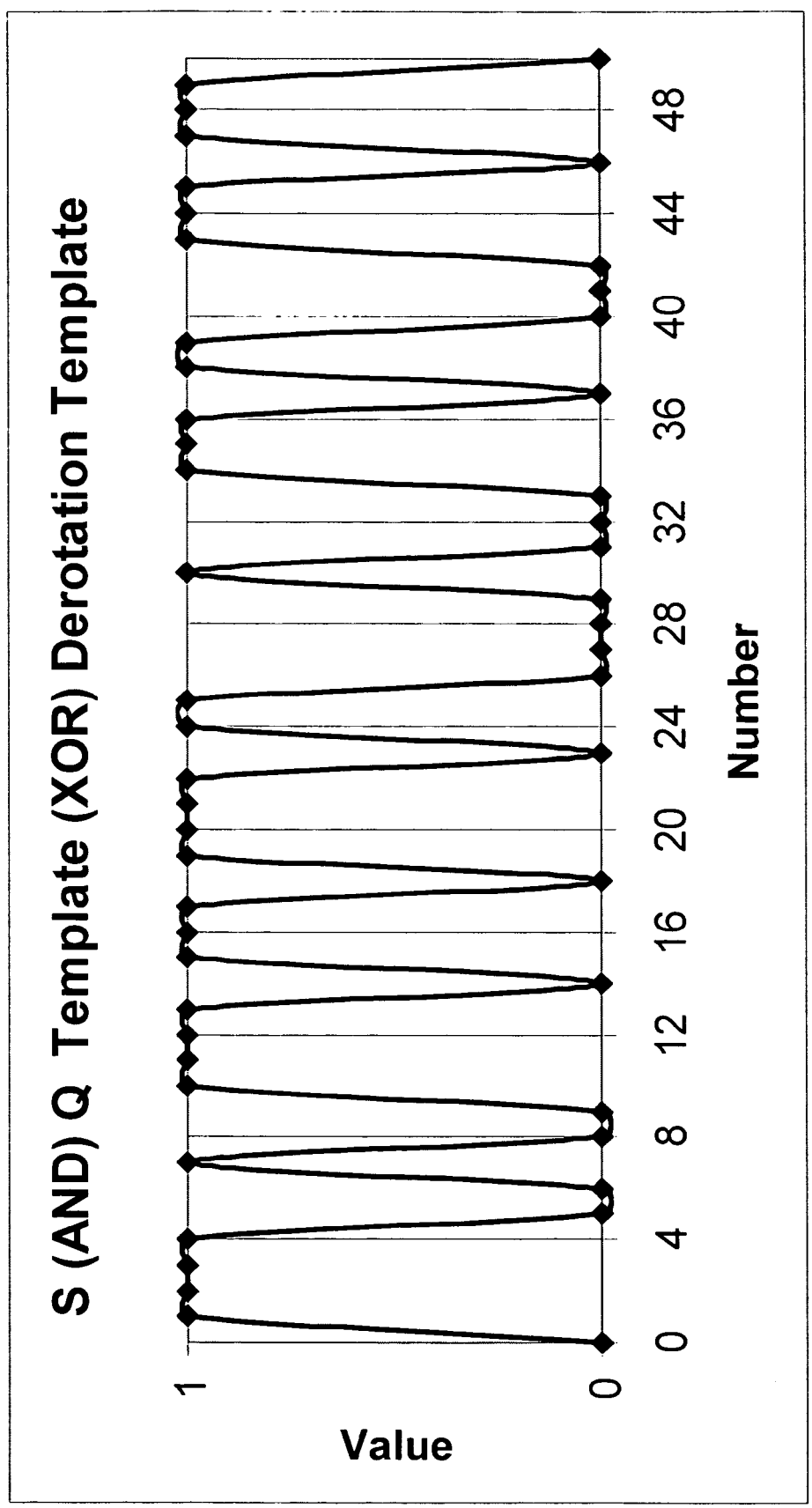

A similar technique is used to derotate the I and Q signal value sets. Referring to FIG. 28, a derotation template for the given IF period hypotheses is generated from a set of four-bit kernel templates including a template 1 having a value 1100, a template 2 having a value 0110, a template 3 having a value 0011, and a template 4 having a value 1001 (it will be appreciated that these kernel templates correspond to quadrants in a complex signal space). Similar to the generation of the I and Q templates, these templates are changed every 8 signal values, i.e., starting with template 1 at signal value number 0, the template changes to template 2 at signal value number 4, remains at template 2 at signal value number 8, changes to template 3 at signal value number 12, and so on. The derotation template thus generated is applied to the I and Q signal value sets shown in FIGS. 26 and 27 using a bitwise logical XOR operation to produce the derotated I and Q signal value sets shown in FIGS. 29 and 30.

Figure 31:
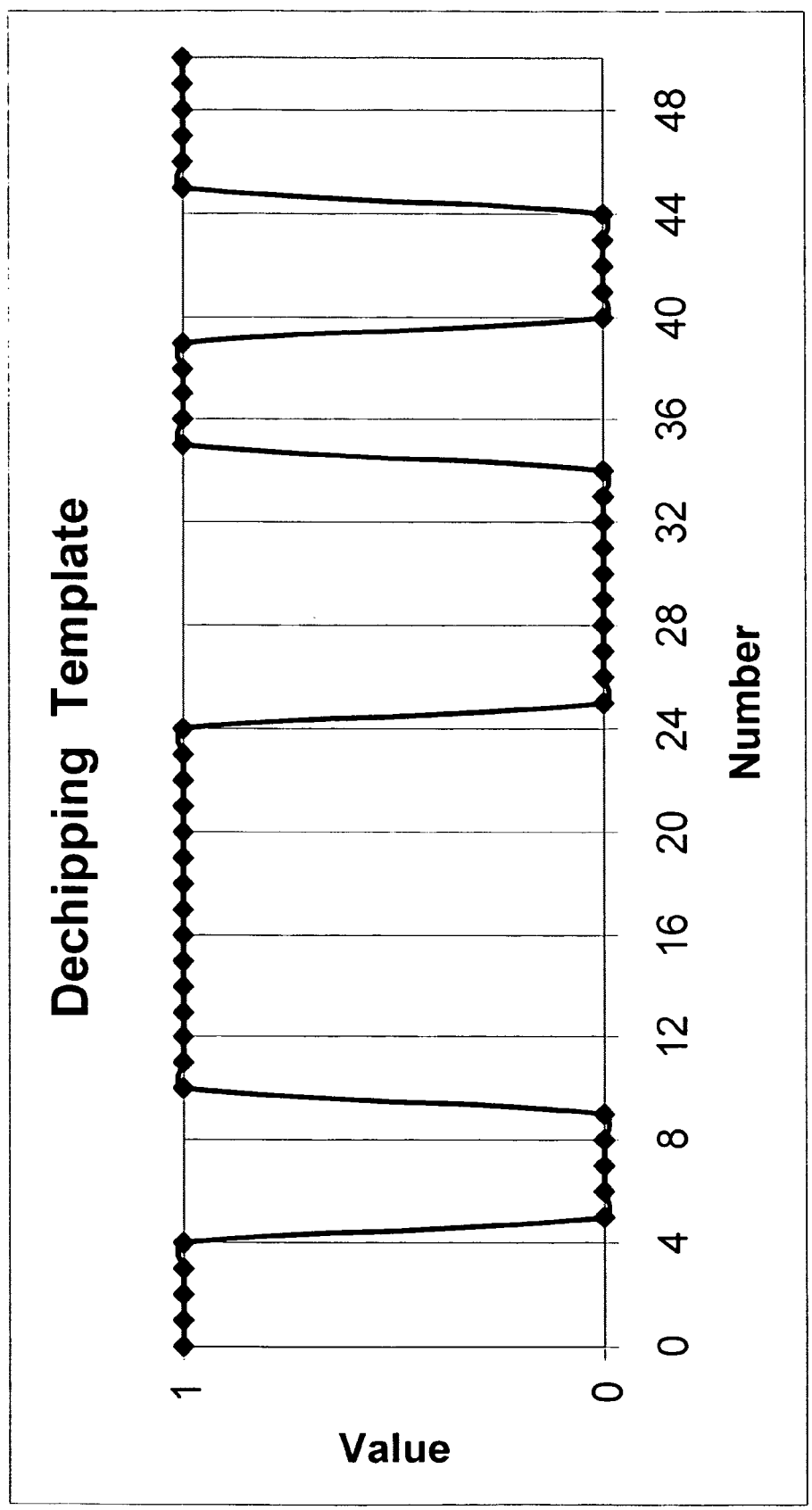
Figure 32:
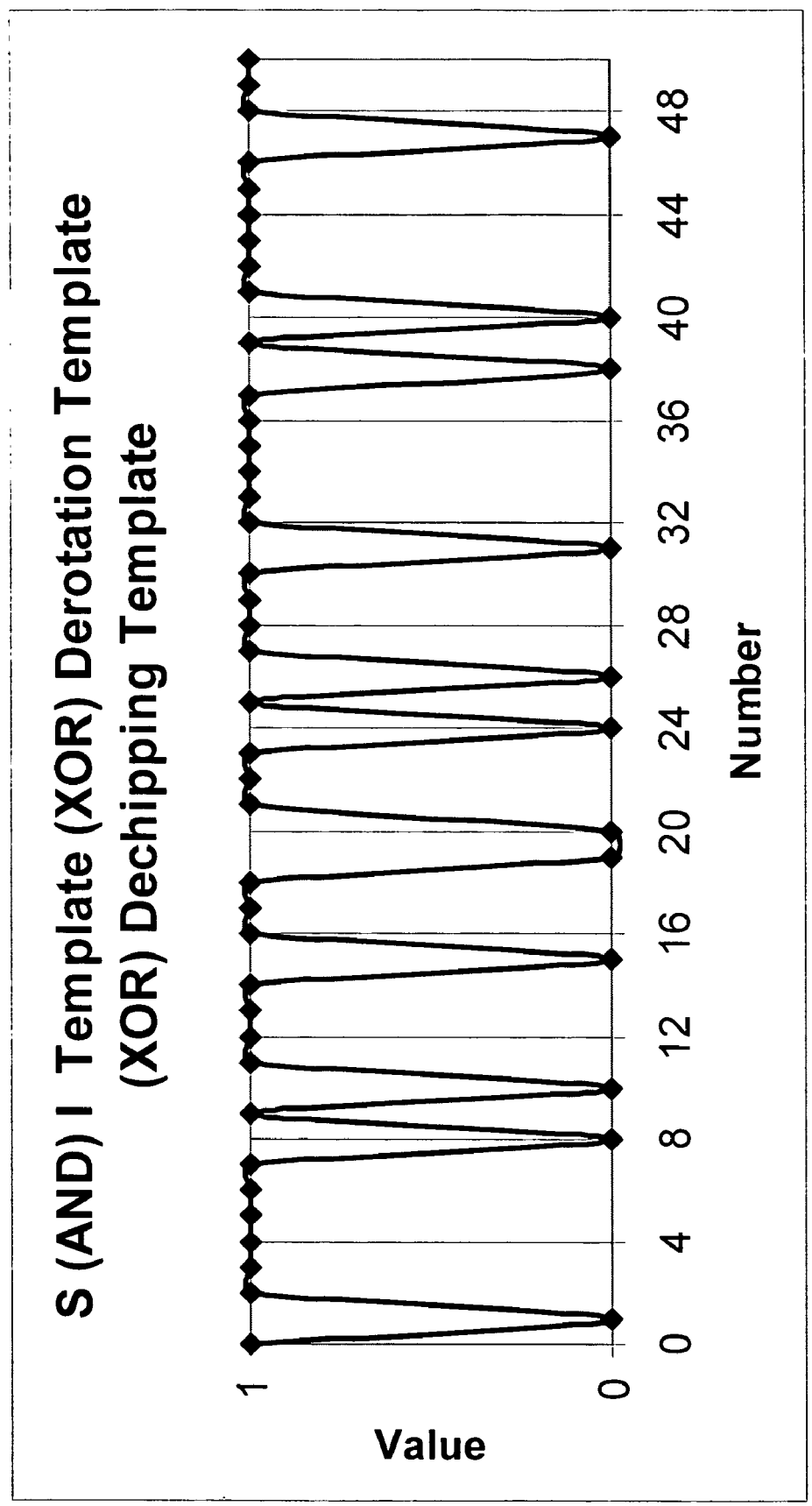
Figure 33:
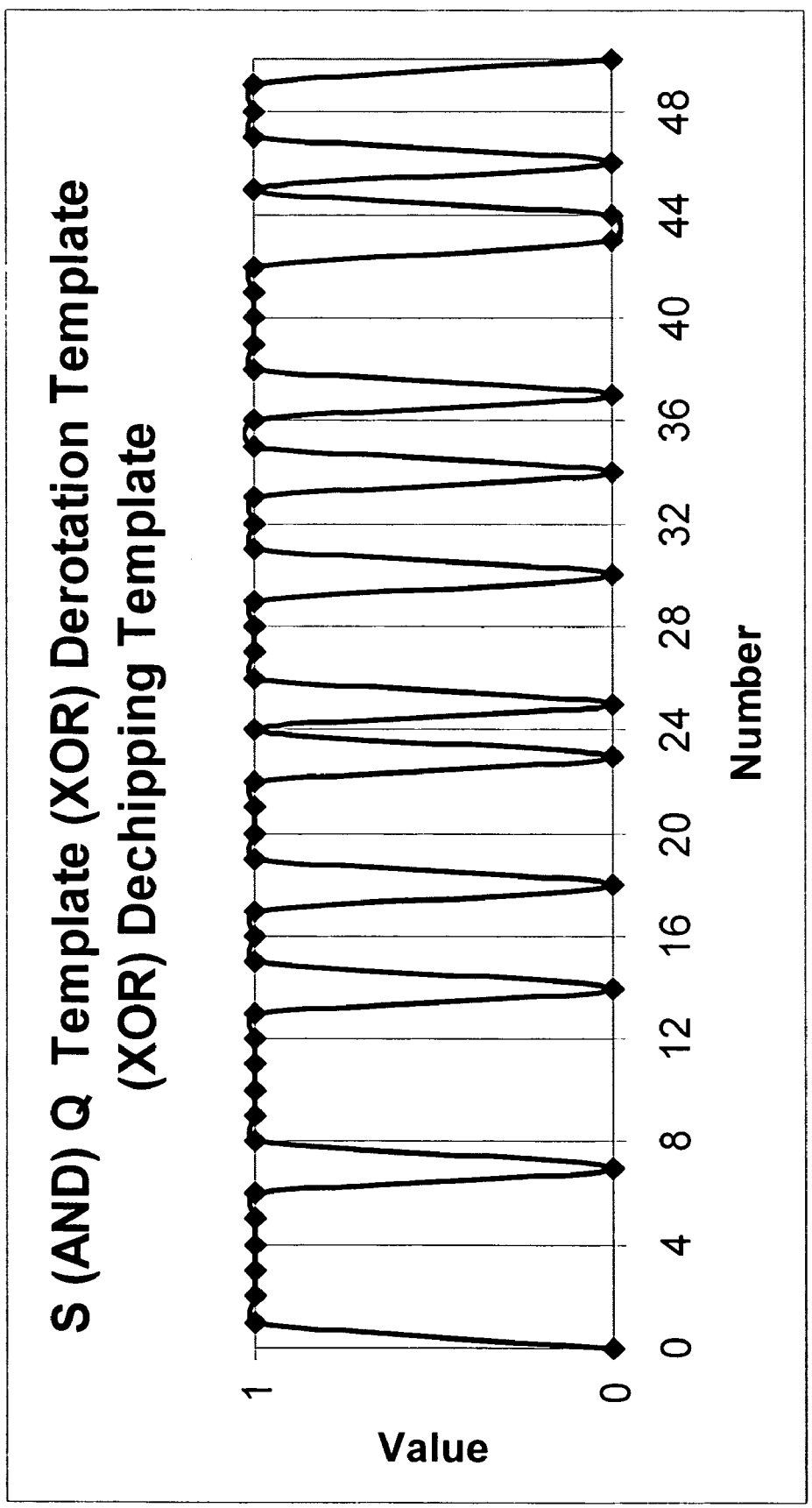
Figure 34:
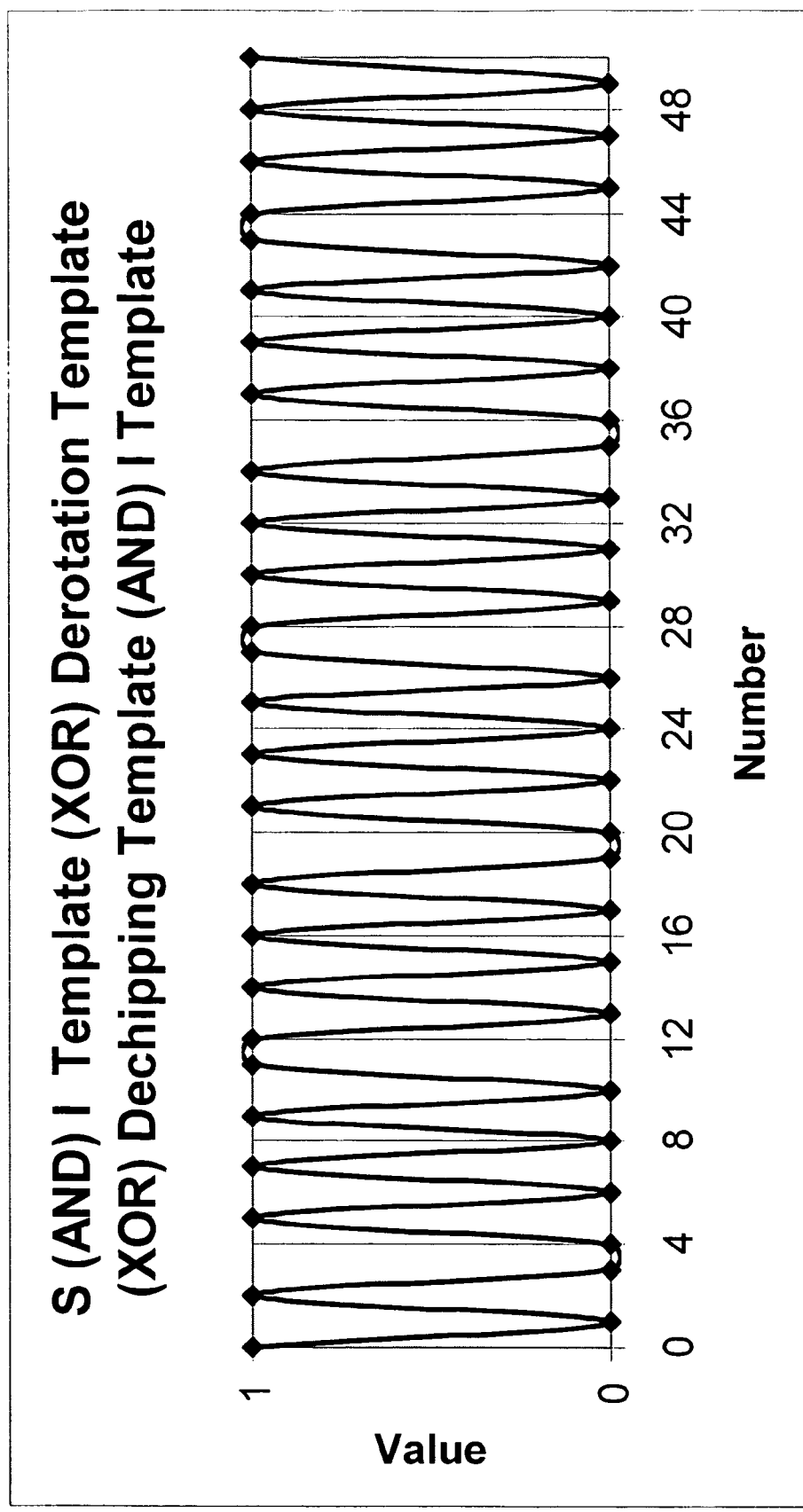
Figure 35:
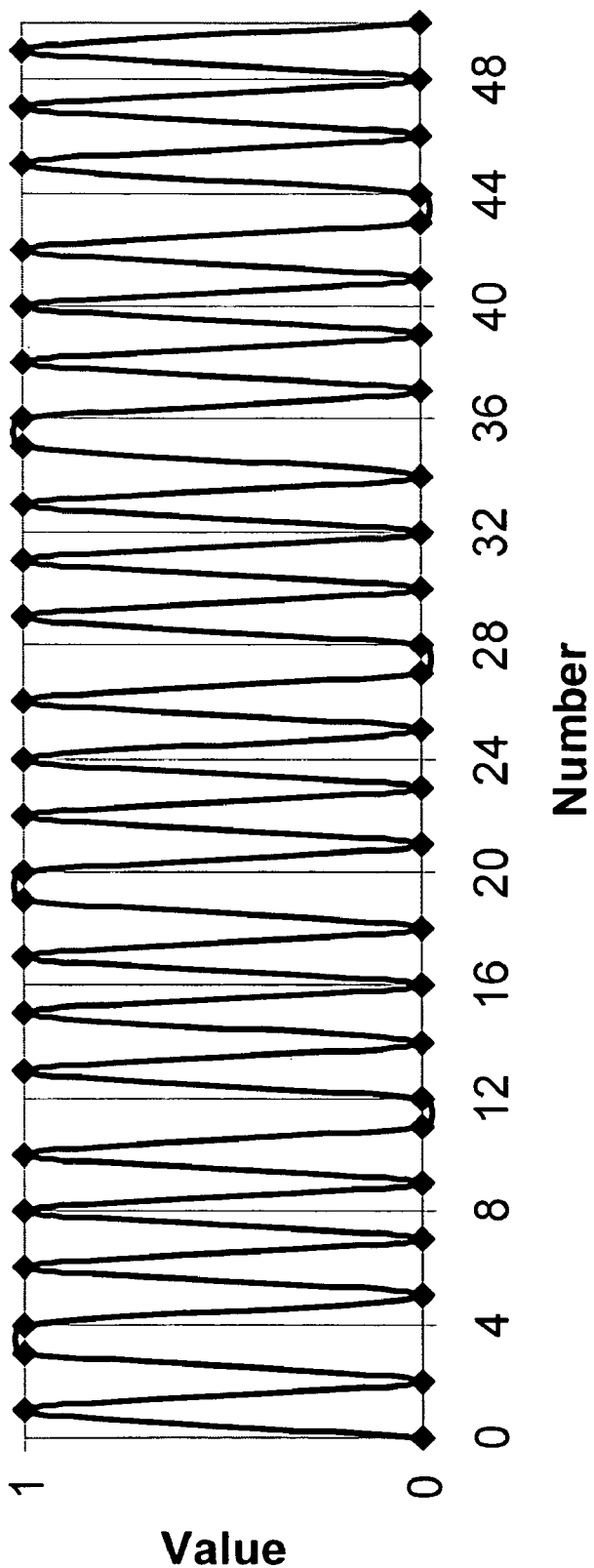

After the above described IF carrier demodulation has been performed, the signal values may then be correlated with a dechipping (PN code) template. Assuming the dechipping template shown in FIG. 31 is applied to the derotated I and Q signal value sets shown in FIGS. 29 and 30, the results shown in FIGS. 32 and 33 are produced by a bitwise logical XOR operation. The I and Q templates are then applied by bitwise logical AND operation to the dechipped signal value sets to the generate correlations shown in FIGS. 34 and 35. An L1 correlation metric may be generated from the I and Q correlations by summing the bits of the I and Q correlations. An L2 correlation metric may be generated by generating respective sums of the bits in the correlations of FIGS. 34 and 35 and computing an RSS value therefrom. For the illustrated example, the I correlation sum is 26 and the Q correlation sum is 25, yielding an L1 metric of 51 and an L2 metric of 36.

Figure 36:
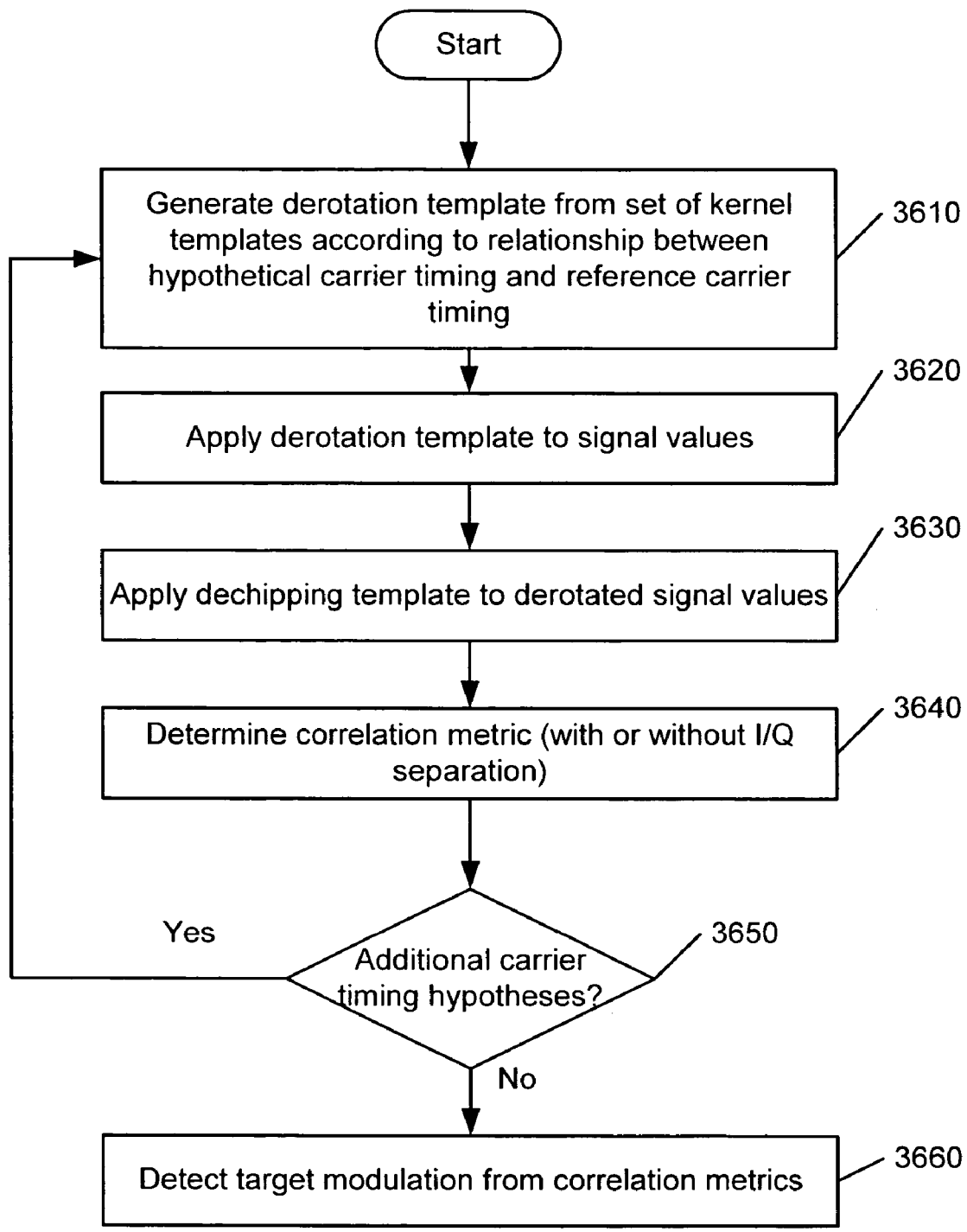
FIG. 36 is a flowchart illustrating exemplary operations for detecting a target modulation according to still further embodiments of the present invention.
Figure 37:
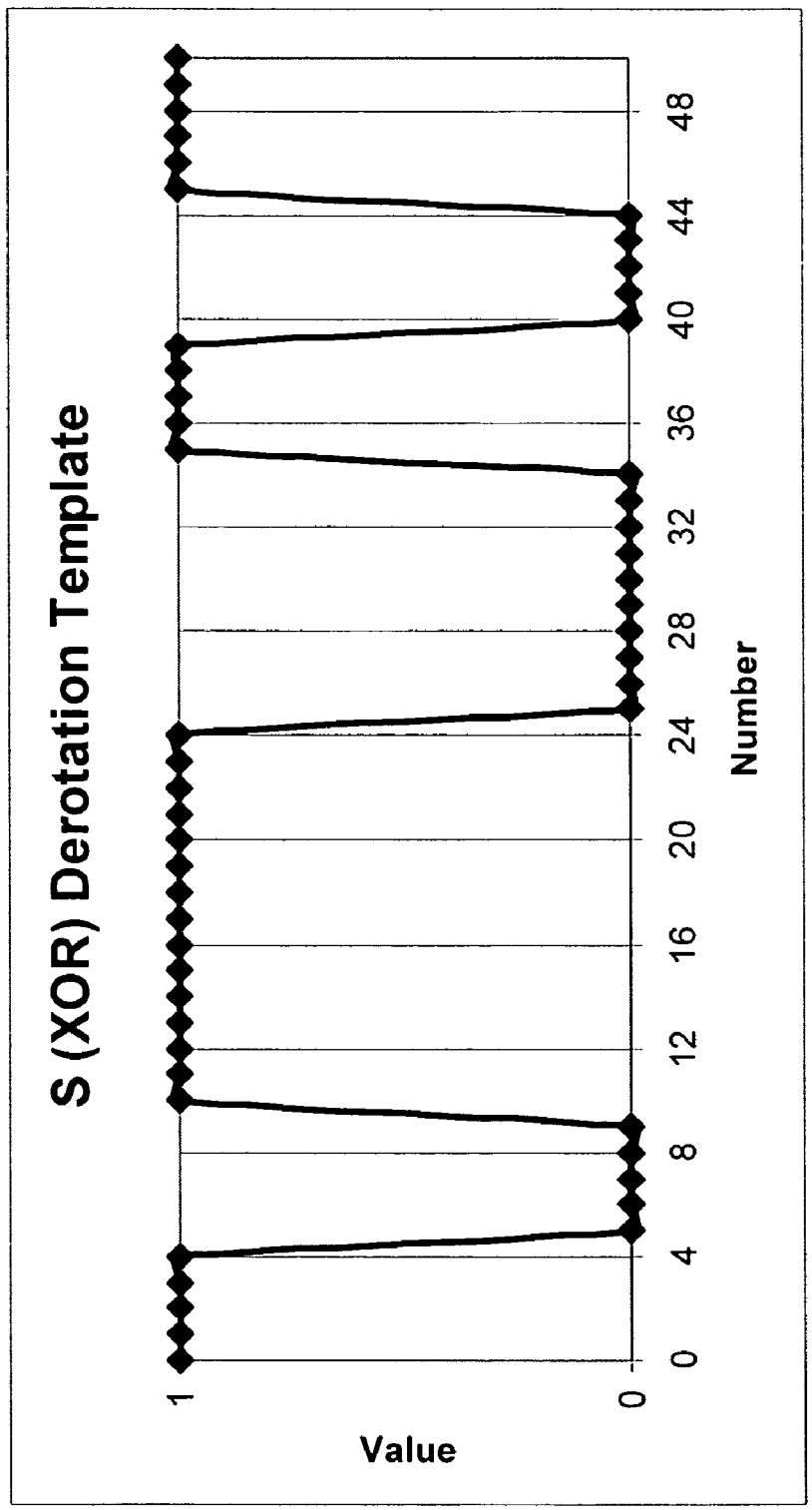
FIGS. 37-40 are signal diagrams illustrating exemplary operations for detecting a target modulation according to some embodiments of the present invention.
Figure 38:
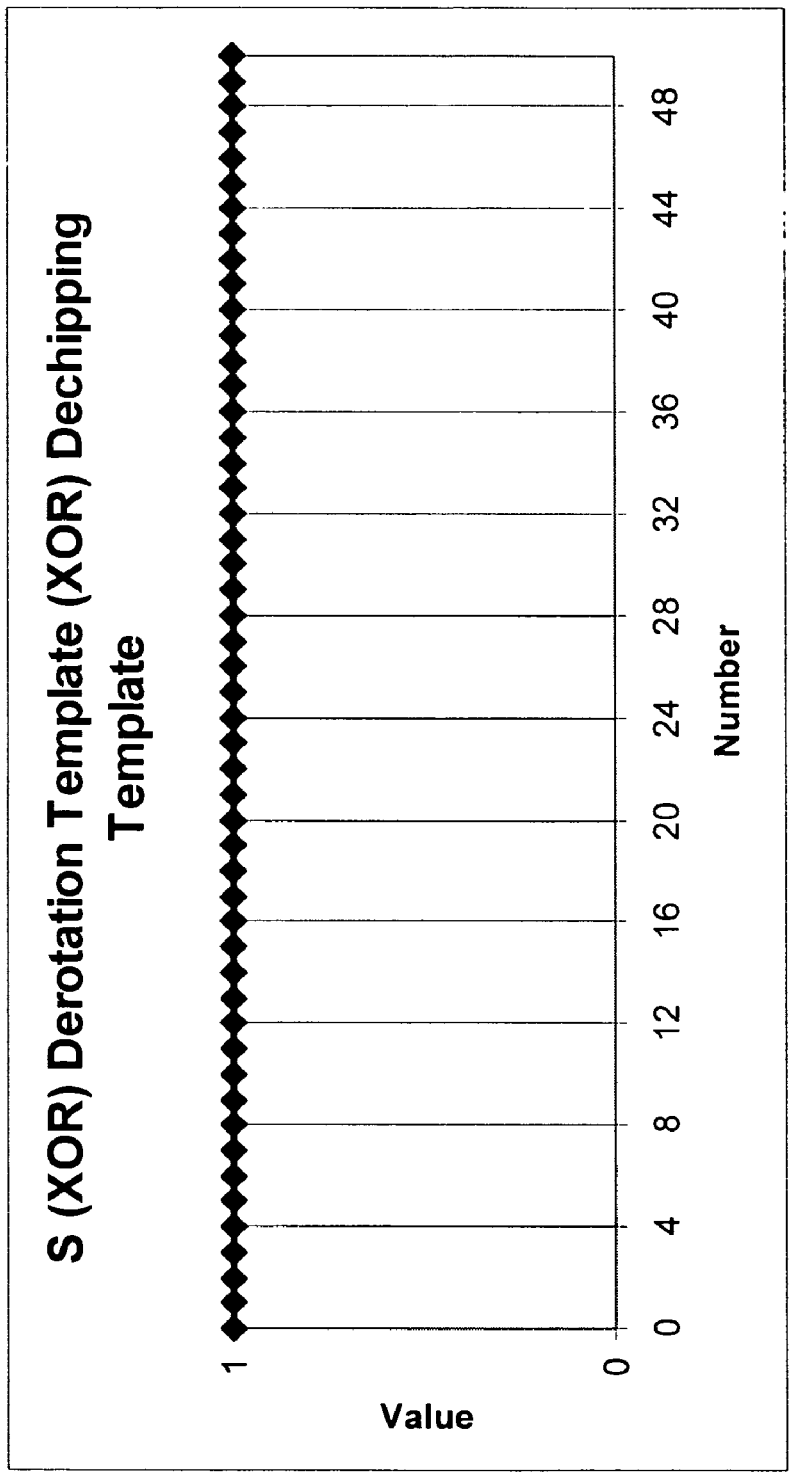

Further embodiments of the present invention arise from a realization that that above-described operations can be streamlined by eliminating certain I,Q template applications. As shown in FIG. 36, for a given carrier timing hypothesis, a derotation template may be generated from a set of kernel templates (e.g., as described above) according to a relationship between the carrier timing hypothesis and a reference carrier timing (block 3610). The derotation template is applied to signal values to generate derotated signal values (block 3620). A target modulation (e.g., dechipping) template is applied to the derotated signal values to generate target modulation correlation (block 3630). A correlation metric (e.g., an L1 or L2 metric) is then determined from the correlation (block 3640). As described in greater detail below, a correlation metric may be generated with or without I/Q separation of the correlation. If an additional carrier-timing hypothesis is to be evaluated (block 3850), the template generation, derotation, dechipping and metric determination operations are repeated for the new hypothesis (blocks 3610, 3620, 3630, 3640). After correlation metrics for a plurality of hypotheses have been generated, the target modulation (e.g., the chipping code) is detected based on the correlation metrics.

Figure 39:
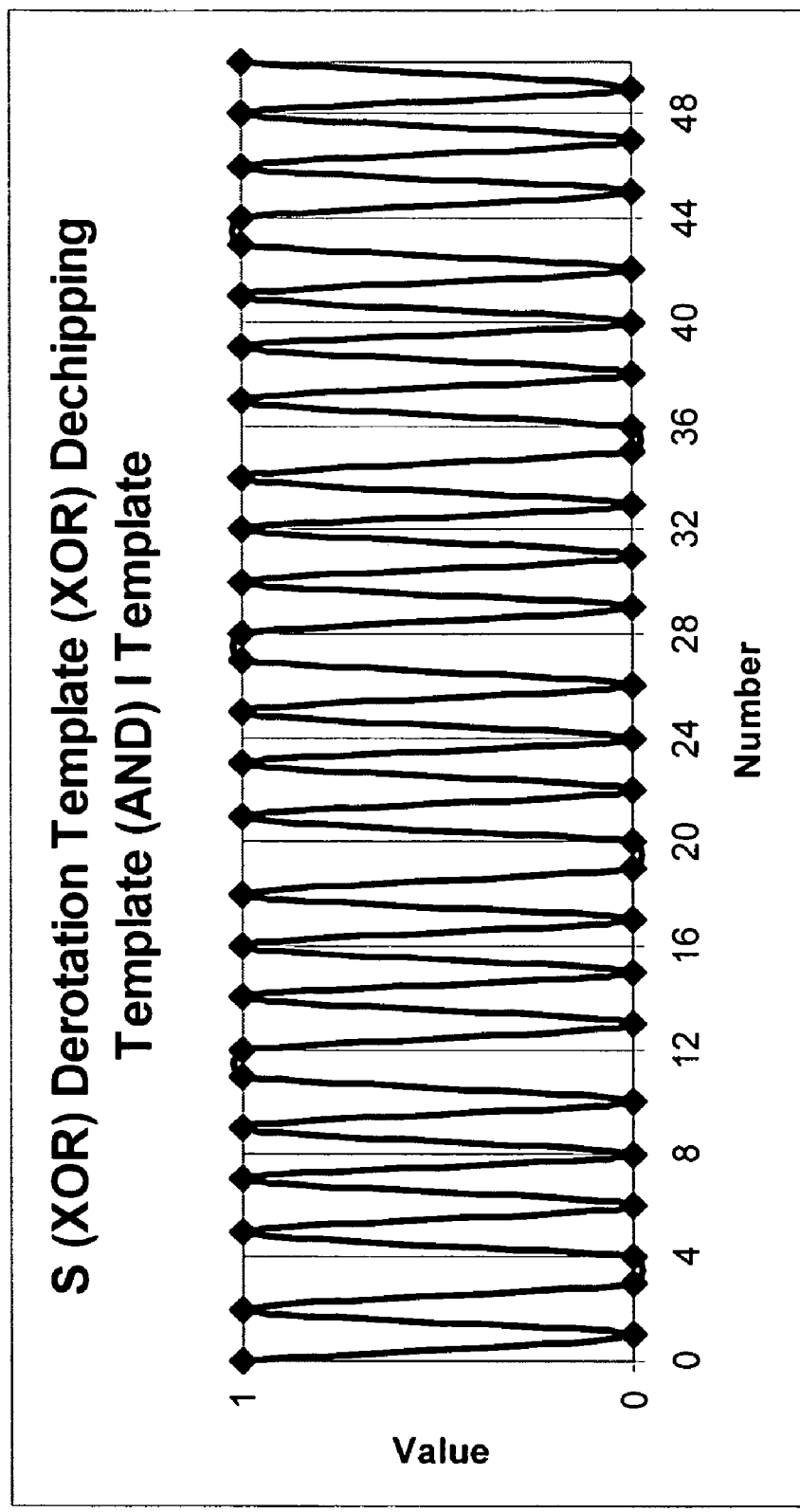
Figure 40:
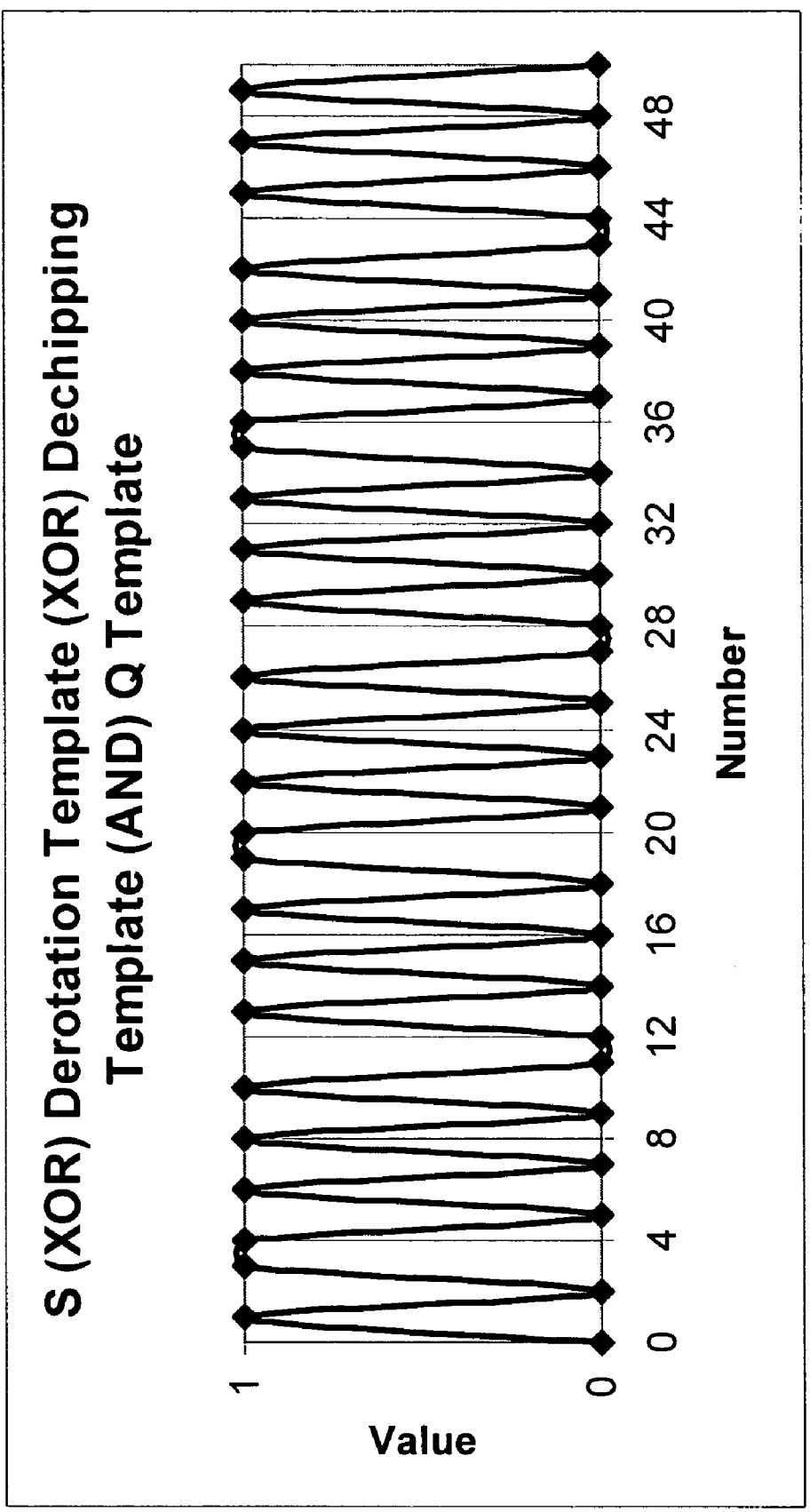

An exemplary application of such a process for the signal S of FIG. 21 will now be described with reference to FIGS. 37-40. Application of the derotation template (generated as described above with reference to FIG. 28) to the signal S yields the result shown in FIG. 37. Application of the dechipping template (shown above in FIG. 31) yields the result shown in FIG. 38. Application of the I and Q templates (generated as described above with reference to FIGS. 23-25) yields I and Q correlations as shown in FIGS. 39 and 40, respectively. The L1 metric for this example is 51, and the L2 metric is 36, in agreement with the result of the process described with reference to FIGS. 22-35. It will be appreciated that, if only an L1 metric is desired, the I/Q separation described with reference to FIGS. 39 and 40 could be eliminated, such that the operations for generating a correlation metric for a given IF hypothesis could be reduced to: (1) derotation template generation; (2) derotation (XOR); (3) dechipping (XOR); and (4) summation. It will be appreciated that the last three operations may each be implemented in a single instruction cycle using one-bit parallel processing techniques along the lines described in the aforementioned copending U.S. patent application Ser. No. 10/919,154.

FIGS. 1-40 illustrate architecture, functionality, and operations of exemplary implementations of apparatus, methods and computer program products according to various embodiments of the present invention. It should also be noted that, in some alternative implementations, the acts illustrated in the figures may occur out of the order noted in the figures. For example, two operations shown in succession may, in fact, be executed substantially concurrently, or the operations may sometimes be executed in the reverse order, depending upon the functionality involved.

In the drawings and specification, there have been disclosed typical illustrative embodiments of the invention and, although specific terms are employed, they are used in a generic and descriptive sense only and not for purposes of limitation, the scope of the invention being set forth in the following claims.

That which is claimed:

1. A method of searching for a target modulation in a signal, the method comprising performing the following for each of a plurality of hypothetical carrier timings:
   shifting signal values corresponding to the signal according to a relationship between the hypothetical carrier timing and a reference carrier timing by augmenting or reducing a set of signal values according to the relationship between the hypothetical carrier timing and a reference carrier timing;
   demodulating the shifted signal values according to the reference carrier timing to produce demodulated signal values;
   shifting the demodulated signal values according to the relationship of the hypothetical carrier timing and the reference carrier timing by augmenting or reducing a set of demodulated signal values according to the relationship of the hypothetical carrier timing and the reference carrier timing; and
   determining a correlation of the shifted demodulated signal values with the target modulation,
   wherein the method further comprises detecting the target modulation responsive to the determined correlations for the hypothetical carrier timings.

2. A method according to claim 1, wherein the target modulation comprises a pseudonoise (PN) code.

3. A method according to claim 2, wherein the PN code comprises one of a GPS code or a CDMA communications system code.

4. A method according to claim 2, wherein determining a correlation of the shifted demodulated signal values with the target modulation comprises determining respective correlations of the shifted demodulated signal values with respective time-shifted versions of the PN code, and wherein detecting the target modulation responsive to the determined correlations for the hypothetical carrier timings comprises detecting a code phase of the PN code responsive to the determined correlations.

5. A method according to claim 1:
   wherein demodulating the shifted signal values according to the reference carrier timing to produce demodulated signal values comprises:
      sorting the shifted signal values into in-phase (I) and quadrature (Q) signal value sets; and
      multiplying the respective I and Q signal value sets by respective sine and cosine reference sequences at the reference carrier timing to produce demodulated I and Q signal value sets;
   wherein shifting the demodulated signal values according to the relationship of the hypothetical carrier timing and the reference carrier timing comprises shifting the demodulated I and Q signal value sets according to the relationship of the hypothetical carrier timing and the reference carrier timing;
   wherein determining a correlation of the shifted demodulated signal values with the target modulation comprises determining respective correlations of the shifted demodulated I and Q signal value sets with the target modulation; and
   wherein detecting the target modulation responsive to the determined correlations for the hypothetical carrier timings comprises detecting the target modulation responsive to the determined correlations of the shifted demodulated I and Q signal value sets with the target modulation.

6. A method according to claim 1:
wherein augmenting or reducing a set of signal values according to the relationship between the hypothetical carrier timing and a reference carrier timing comprises replicating or removing signal values at periodic sample intervals; and
wherein augmenting or reducing a set of demodulated signal values according to the relationship of the hypothetical carrier timing and the reference carrier timing comprises replicating or removing signal values at periodic sample intervals.

7. A method according to claim 1:
wherein determining a correlation of the shifted demodulated signal values with the target modulation comprises performing the following for each a plurality of hypothetical target modulation timings:
    shifting the shifted demodulated signal values according to a relationship between the target modulation hypothetical timing and a target modulation reference timing to produce a revised set of demodulated signal values; and
    determining a correlation of the revised set of demodulated signal values with the target modulation at the target modulation reference timing; and
wherein detecting the target modulation responsive to the determined correlation comprises detecting the target modulation responsive to the correlations of the revised sets of signal values with the target modulation.

8. A method according to claim 1, wherein detecting the target modulation responsive to the determined correlations for the hypothetical carrier timings comprises:
    generating respective correlation metrics for the respective determined correlations; and
    detecting the target modulation responsive to the correlation metrics.

9. A method of searching for a target modulation in a signal, the method comprising:
    determining respective target modulation correlations for respective carrier timing hypotheses by demodulating signal values corresponding to the signal for the respective carrier timing hypotheses using a common carrier demodulation template; and
    detecting the target modulation from the target modulation correlations,
    wherein determining respective target modulation correlations for respective carrier timing hypotheses by demodulating signal values corresponding to the signal for the respective carrier timing hypotheses using a common carrier demodulation template comprises:
    generating respective carrier demodulation templates for the respective carrier timing hypotheses from a common set of kernel templates based on relationships between the respective carrier timing hypotheses and a reference carrier timing; and
    determining the respective target modulation correlations for the respective carrier timing hypotheses using respective ones of the carrier demodulation templates.

10. A method according to claim 9, wherein determining respective target modulation correlations for respective carrier timing hypotheses by demodulating signal values for the respective carrier timing hypotheses using a common carrier demodulation template comprises:
    shifting signal values for the respective carrier timing hypotheses according to respective relationships between the carrier timing hypotheses and a reference carrier timing;
    applying the common carrier demodulation template to the shifted signal values for each of the carrier timing hypotheses to generate respective sets of demodulated signal values for the respective carrier timing hypotheses; and
    shifting the respective sets of demodulated signal values according to the respective relationships between the carrier timing hypotheses and the reference carrier timing.

11. A method according to claim 10:
wherein determining respective target modulation correlations for respective carrier timing hypotheses by demodulating signal values for the respective carrier timing hypotheses using a common carrier demodulation template further comprises determining respective correlations of the respective shifted sets of demodulated signal values with the target modulation; and
wherein detecting the target modulation from the target modulation correlations comprises detecting the target modulations from the correlations of the respective shifted sets of demodulated signal values with the target modulation.

12. A method according to claim 11:
wherein applying the common carrier demodulation template to the shifted signal values for each of the carrier timing hypotheses to generate respective sets of demodulated signal values for the respective carrier timing hypotheses comprises:
    sorting the shifted signal values into in-phase (I) and quadrature (Q) signal value sets; and
    multiplying the respective I and Q signal value sets by respective sine and cosine reference sequences at the reference carrier timing to produce demodulated I and Q signal value sets;
    wherein shifting the respective sets of demodulated signal values according to the respective relationships between the carrier timing hypotheses and a reference carrier timing comprises shifting the demodulated I and Q signal value sets for the respective carrier timing hypotheses according to the respective relationships of the carrier timing hypotheses and the reference carrier timing;
    wherein determining respective correlations of the respective shifted sets of demodulated signal values with the target modulation comprises determining respective correlations of the shifted demodulated I and Q signal value sets with the target modulation; and
    wherein detecting the target modulations from the correlations of the respective shifted sets of demodulated signal values with the target modulation comprises detecting the target modulation responsive to the determined correlations of the shifted demodulated I and Q signal value sets with the target modulation.

13. A method according to claim 10, wherein the shifting of the respective sets of demodulated signal values according to the respective relationships between the carrier timing hypotheses and the reference carrier timing provides a timing relationship among the demodulated signal values that is substantially the same as timing relationships among the signal values before the shifting of the signal values for the respective carrier timing hypotheses according to respective relationships between the carrier timing hypotheses and a reference carrier timing.

14. A method according to claim 10:
wherein shifting signal values for the respective carrier timing hypotheses according to respective relationships between the carrier timing hypotheses and a reference carrier timing comprises augmenting or reducing a set of signal values according to the relationship between a carrier timing hypothesis and the reference carrier timing; and
wherein shifting the respective sets of demodulated signal values according to the respective relationships between the carrier timing hypotheses and the reference carrier timing comprises augmenting or reducing a set of demodulated signal values according to a relationship of between a carrier timing hypothesis and the reference carrier timing.

15. A method according to claim 14:
wherein augmenting or reducing a set of signal values according to the relationship between a carrier timing hypothesis and the reference carrier timing comprises replicating or removing signal values at periodic sample intervals; and
wherein augmenting or reducing a set of demodulated signal values according to a relationship of between a carrier timing hypothesis and the reference carrier timing comprises replicating or removing signal values at periodic sample intervals.

16. A method according to claim 9, wherein determining respective target modulation correlations for respective carrier timing hypotheses by demodulating signal values for the respective carrier timing hypotheses using a common carrier demodulation template based on a reference carrier timing comprises determining respective target modulation correlations for respective target modulation timing hypotheses using a common target demodulation template.

17. A method according to claim 9:
wherein generating respective carrier demodulation templates for the respective carrier timing hypotheses from a common set of kernel templates based on relationships between the respective carrier timing hypotheses and a reference carrier timing comprises generating respective derotation templates for the respective carrier timing hypotheses from a common set of derotation kernel templates based on relationships between the respective carrier timing hypotheses and the reference carrier timing; and
wherein determining the respective target modulation correlations for the respective carrier timing hypotheses using respective ones of the carrier demodulation templates comprises:
applying the respective derotation templates to the signal values to produce respective sets of derotated signal values; and
applying a target demodulation template to the respective sets of derotated signal values to generate the respective target modulation correlations.

18. A method according to claim 17, wherein detecting the target modulation from the target modulation correlations comprises:
generating respective correlation metrics for the respective target modulation correlations; and
detecting the target modulation from the correlation metrics.

19. A method according to claim 18, wherein generating respective correlation metrics for the respective target modulation correlations comprises generating the respective correlation metrics without generating separate I and Q target modulation correlations.

20. A method according to claim 18, wherein generating respective correlation metrics for the respective target modulation correlations comprises:
applying respective sets of I and Q templates to the respective sets of derotated signal values to generate respective sets of I and Q correlations for the respective carrier timing hypotheses; and
generating the respective correlation metrics from the I and Q correlations.

21. A method according to claim 20, further comprising generating the respective sets of I and Q templates from a common set of I and Q kernel templates based on relationships between the respective carrier timing hypotheses and a reference carrier timing.

22. A method according to claim 9, wherein the target modulation comprises a pseudonoise (PN) code.

23. A method according to claim 22, wherein the PN code comprises one of a GPS code or a CDMA communications system code.

24. A method according to claim 9, wherein detecting the target modulation from the target modulation correlations comprises detecting a phase of the target modulation in the signal responsive to the target modulation correlations.

25. An apparatus for searching for a target modulation in a signal, the apparatus comprising:
means for determining respective target modulation correlations for respective carrier timing hypotheses by demodulating signal values corresponding to the signal for the respective carrier timing hypotheses using a common carrier demodulation template; and
means for detecting the target modulation from the target modulation correlations,
wherein the means for determining respective target modulation correlations for respective carrier timing hypotheses by demodulating signal values corresponding to the signal for the respective carrier timing hypotheses using a common carrier demodulation template comprises:
means for generating respective carrier demodulation templates for the respective carrier timing hypotheses from a common set of kernel templates based on relationships between the respective carrier timing hypotheses and a reference carrier timing; and
means for determining the respective target modulation correlations for the respective carrier timing hypotheses using respective ones of the carrier demodulation templates.

26. An apparatus according to claim 25, wherein the means for determining respective target modulation correlations for respective carrier timing hypotheses by demodulating signal values for the respective carrier timing hypotheses using a common carrier demodulation template comprises:
means for shifting signal values for the respective carrier timing hypotheses according to respective relationships between the carrier timing hypotheses and a reference carrier timing;
means for applying the common carrier demodulation template to the shifted signal values for each of the carrier timing hypotheses to generate respective sets of demodulated signal values for the respective carrier timing hypotheses; and
means for shifting the respective sets of demodulated signal values according to the respective relationships between the carrier timing hypotheses and the reference carrier timing.

27. An apparatus according to claim 26:
wherein the means for determining respective target modulation correlations for respective carrier timing hypotheses by demodulating signal values for the respective carrier timing hypotheses using a common carrier demodulation template further comprises means for determining respective correlations of the respective shifted sets of demodulated signal values with the target modulation; and
wherein the means for detecting the target modulation from the target modulation correlations comprises means for detecting the target modulations from the correlations of the respective shifted sets of demodulated signal values with the target modulation.

28. A GPS-enabled device, comprising:
a radio processor configured to convert a radio signal to an intermediate frequency (IF) signal values; and
a correlation processor configured to determine respective PN code correlations for respective IF timing hypotheses using a common IF demodulation template and to detect the target modulation from the target modulation correlations,
wherein the correlation processor is operative to generate respective IF demodulation templates for the respective carrier timing hypotheses from a common set of kernel templates based on relationships between the respective IF timing hypotheses and a reference IF timing and to determine the respective PN code correlations for the respective IF timing hypotheses using respective ones of the IF demodulation templates.

29. A device according to claim 28, wherein the correlation processor is operative to shift signal values for the respective IF timing hypotheses according to respective relationships between the IF timing hypotheses and a reference IF timing, to apply the common IF demodulation template to the shifted signal values for each of the carrier timing hypotheses to generate respective sets of demodulated signal values for the respective IF timing hypotheses, and to shift the respective sets of demodulated signal values according to the respective relationships between the IF timing hypotheses and the reference IF timing.

30. A device according to claim 29 wherein the correlation processor is operative to determine respective correlations of the respective shifted sets of demodulated signal values with the PN code and to detect the PN code from the correlations of the respective shifted sets of demodulated signal values with the PN code.

31. A device according to claim 28, wherein the IF timing hypotheses correspond to respective hypothetical Doppler shifts.

32. A computer program product for searching for a target modulation in a signal, the computer program product comprising computer program code embodied in a computer readable medium, the program code comprising:
program code configured to determine respective target modulation correlations for respective carrier timing hypotheses by demodulating signal values corresponding to the signal for the respective carrier timing hypotheses using a common carrier demodulation template; and
program code configured to detect the target modulation from the target modulation correlations,
wherein the program code configured to determine respective target modulation correlations for respective carrier timing hypotheses by demodulating signal values corresponding to the signal for the respective carrier timing hypotheses using a common carrier demodulation template comprises:
program code configured to generate respective carrier demodulation templates for the respective carrier timing hypotheses from a common set of kernel templates based on relationships between the respective carrier timing hypotheses and a reference carrier timing; and
program code configured to determine the respective target modulation correlations for the respective carrier timing hypotheses using respective ones of the carrier demodulation templates.

33. A computer program product according to claim 32, wherein the program code configured to determine respective target modulation correlations for respective carrier timing hypotheses by demodulating signal values for the respective carrier timing hypotheses using a common carrier demodulation template comprises:
program code configured to shift signal values for the respective carrier timing hypotheses according to respective relationships between the carrier timing hypotheses and a reference carrier timing;
program code configured to apply the common carrier demodulation template to the shifted signal values for each of the carrier timing hypotheses to generate respective sets of demodulated signal values for the respective carrier timing hypotheses; and
program code configured to shift the respective sets of demodulated signal values according to the respective relationships between the carrier timing hypotheses and the reference carrier timing.

34. A computer program product according to claim 33:
wherein the program code configured to determine respective target modulation correlations for respective carrier timing hypotheses by demodulating signal values for the respective carrier timing hypotheses using a common carrier demodulation template comprises program code configured to determine respective correlations of the respective shifted sets of demodulated signal values with the target modulation; and
wherein the program code configured to detect the target modulation from the target modulation correlations comprises program code configured to detect the target modulations from the correlations of the respective shifted sets of demodulated signal values with the target modulation.

35. An apparatus for searching for a target modulation in a signal, the apparatus comprising:
means for performing the following for each of a plurality of hypothetical carrier timings:
shifting signal values corresponding to the signal according to a relationship between the hypothetical carrier timing and a reference carrier timing by augmenting or reducing a set of signal values according to the relationship between the hypothetical carrier timing and a reference carrier timing;
demodulating the shifted signal values according to the reference carrier timing to produce demodulated signal values;
shifting the demodulated signal values according to the relationship of the hypothetical carrier timing and the reference carrier timing by augmenting or reducing a set of demodulated signal values according to the relationship of the hypothetical carrier timing and the reference carrier timing; and
determining a correlation of the shifted demodulated signal values with the target modulation; and
means for detecting the target modulation responsive to the determined correlations for the hypothetical carrier timings.

* * * * *